US007025264B2

(12) United States Patent
Ishigame et al.

(10) Patent No.: US 7,025,264 B2
(45) Date of Patent: Apr. 11, 2006

(54) AUTOMATIC TICKET CHECKING APPARATUS

(75) Inventors: Shinichi Ishigame, Kanagawa-ken (JP); Katsuo Imazuka, Kanagawa-ken (JP); Yasuhir Matsutani, Kanagawa-ken (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 10/705,496

(22) Filed: Nov. 12, 2003

(65) Prior Publication Data

US 2004/0106374 A1 Jun. 3, 2004

Related U.S. Application Data

(62) Division of application No. 09/793,987, filed on Feb. 28, 2001, now Pat. No. 6,732,924.

(30) Foreign Application Priority Data

Feb. 29, 2000 (JP) ............................ 2000-054634
Feb. 29, 2000 (JP) ............................ 2000-054635
Mar. 24, 2000 (JP) ............................ 2000-083773

(51) Int. Cl.
*G06K 7/08* (2006.01)

(52) U.S. Cl. ...................................... 235/449; 235/384

(58) Field of Classification Search ................ 235/384, 235/375, 383, 440, 441, 382, 449, 493
See application file for complete search history.

(56) References Cited

U.S. PATENT DOCUMENTS

| | | | | |
|---|---|---|---|---|
| 4,798,942 | A | 1/1989 | Aubrey | |
| 5,831,547 | A | 11/1998 | Ohtsuki et al. | |
| 5,877,484 | A | 3/1999 | Hirose | |
| 6,070,146 | A | 5/2000 | Mimata | |
| 6,450,404 | B1 * | 9/2002 | Imazuka | 235/381 |
| 6,556,126 | B1 * | 4/2003 | Imazuka et al. | 340/5.7 |
| 6,712,267 | B1 * | 3/2004 | Imazuka | 235/381 |
| 6,732,924 | B1 * | 5/2004 | Ishigame et al. | 235/384 |

FOREIGN PATENT DOCUMENTS

| | | |
|---|---|---|
| EP | 1 079 334 | 2/2001 |
| GB | 2 276 266 | 9/1994 |

OTHER PUBLICATIONS

Cubuc Transportation Systems, Inc., Major Programs, p. 2, line 25+.

* cited by examiner

*Primary Examiner*—Daniel Stcyr
(74) *Attorney, Agent, or Firm*—Pillsbury Winthrop Shaw Pittman LLP

(57) ABSTRACT

An automatic ticket checking apparatus of the present invention is arranged along a passage and has a first conveying mechanism which conveys a magnetic ticket in a first direction along the passage and a second conveying mechanism which is arranged facing in the passage direction against the first conveying mechanism. This automatic ticket checking apparatus reads the information recorded on magnetic tickets and wireless tickets and executes the checking process for user who are advancing in the first direction along the passage and further, reads the information recorded on magnetic tickets and wireless tickets carried by users who are advancing in the second direction along the passage and executes the checking process for users who are advancing in the second direction.

27 Claims, 16 Drawing Sheets

INSIDE OF STATION YARD

OUTSIDE OF STATION YARD

AUTOMATIC TICKET CHECKING APPARATUS

CROSS-REFERENCE TO RELATED APPLICATIONS

This is a Divisional Application of U.S. application Ser. No. 09/793,987, filed Feb. 28, 2001, Now U.S. Pat. No. 6,732,924 which claims priority from the prior Japanese Patent Application Nos. 2000-054634, filed Feb. 29, 2000, 2000-054635, filed Feb. 29, 2000, and 2000-083773, filed Mar. 24, 2000, the entire contents all of which are incorporated herein by reference.

BACKGROUND OF THE INVENTION

1. Field of the Invention

The present invention relates to an automatic ticket checking apparatus that is installed in railway traffic stations, etc.

2. Description of the Related Art

An automatic ticket checking apparatus is installed in railway traffic stations in recent years. This automatic ticket checking apparatus receives a magnetic ticket that is inserted into the apparatus by a user, reads magnetic information recorded thereon and checks if the user is allowable to pass through the gate or not (the entrance into the station yard or exit to the outside therefrom). If the automatic ticket checking apparatus judges that a user is not allowable to pass the gate, a door provided to the apparatus is closed to block a user to pass through the gate. Further, cautions and other guidance may be displayed on a display panel or output (announced) from a speaker.

Such an automatic ticket checking apparatus is capable of processing tickets in various sizes including ordinary size and commutation ticket size. For example, short distance tickets that are effective only for one day (a normal size), a commutation ticket (commutation ticket size) and SF (Stored Fare) card (commutation ticket size) can be processed. For this purpose, a ticket conveying mechanism in an automatic ticket checking apparatus for conveying tickets is equipped with an aligning mechanism to adapt to tickets in various sizes. In addition, the automatic ticket checking apparatus is capable of collectively process a plurality of tickets. For example, it is able to process commutation tickets and SF cards collectively. For this purpose, a ticket holding mechanism is provided to the ticket conveying mechanism in the automatic ticket checking apparatus to adapt to a plurality of tickets.

Further, when a passage that is formed along the automatic ticket checking apparatus is used commonly as a ticket checking passage as well as a ticket collection passage, two units of the automatic ticket checking apparatus are normally installed in a set as a boundary of passages. These two units of the automatic ticket checking apparatus are installed so that a ticket take-out port provided at one of two units comes to a ticket insert port side provided at the other unit. And the ticket insert port provided at one of two units comes to the ticket take-out port side of the other unit.

Further, this automatic ticket checking apparatus is also provided with a wireless communication function in addition to the magnetic ticket processing function; that is, by wireless communicating with an IC card type ticket that is capable of wireless communication, reads using information therefrom likewise the magnetic ticket and judges whether the passing of a user carrying a wireless ticket is allowable or not.

As described above, the conveying mechanism of an existing automatic ticket checking apparatus is provided with an aligning mechanism for processing various size tickets and further, provided with a ticket holding mechanism for collectively processing a plurality of tickets. As a result, the conveying mechanism becomes long and there was such a problem that the entire automatic ticket checking apparatus becomes long. In other words, to cope with tickets in various sizes and process a plurality of tickets collectively, it was difficult to make an automatic ticket checking apparatus small in size.

Further, because the passage for the ticket checking is also used for the ticket collection as described above, there was such a problem that when two units of automatic tick t checking apparatus are installed in a set as the passage boundary, two units are to be installed between the passages (two units are installed at the passage boundary), and an occupation rate of automatic ticket checking apparatus at the ticket checking corner increased.

Further, when the automatic ticket checking apparatus was operated to adapt to both of magnetic and wireless tickets, there was such a problem that the automatic ticket checking apparatus is not able to make the fare adjustment of these tickets in combination.

SUMMARY OF THE INVENTION

It is an object of the present invention to provide an automatic ticket checking apparatus that is able to cope with the ticket checking process as well as ticket collection process and is downsized.

Further, it is another object of the present invention to provide an automatic ticket checking apparatus that is capable of coping with magnetic tickets and wireless communication type tickets and operate at a high efficiency according to the operating state.

It is a further object of the present invention to provide an automatic ticket checking device with a sharply reduced space required for installation and capable of surely communicating with wireless communication type tickets.

According to the present invention, an automatic ticket checking apparatus is provided. This automatic ticket checking apparatus comprises a first conveying mechanism for conveying a magnetic ticket in a first direction along a first passage way; first ticket checking means for reading information recorded on a magnetic ticket and a wireless ticket and judging whether or not the information read by the first checking means is valid; a second conveying mechanism arranged opposite side of the first conveying mechanism in the apparatus for conveying a magnetic ticket in a second direction opposing to the first direction along the first passageway and along a second passage way in parrallele with the first passage way; and second ticket checking means for reading information recorded on a magnetic ticket and a wireless ticket and judging whether or not the information read by the second checking means is valid.

Further, according to the present invention, an automatic ticket checking apparatus is provided. This automatic ticket checking apparatus comprises first processing means for processing a magnetic ticket restricted to one size; second processing means for processing a wireless ticket in kinds differing from the magnetic tickets; first ticket checking means for executing the ticket checking process based on the process by the first processing means; and second ticket checking means for executing the ticket checking process based on the process by the second processing means.

In addition, according to the present invention, an automatic ticket checking apparatus is provided. This automatic ticket checking apparatus comprises a main body; first receiving means provided to the main body for receiving using data from a first wireless ticket which is carried by a first user who is passing along a prescribed passage and recording the using data; first judging means for judging a passing propriety of the first user based on the using data received by the first receiving means; approving means for approving the passing of the first user when the passing is judged to be approved by the first judging means; second receiving means provided to the main body for receiving using data from a second wireless ticket which is carried by a second user who is passing along a passage in the direction differing from the prescribed passage and recording the using data; second judging means for judging a passing property of the second user based on the using data received by the second receiving means; third judging means for judging whether the second wireless ticket is the same as the first wireless ticket that is carried by the first user who was approved to pass by the approving means based on the using data received by the second receiving means; prohibiting means for prohibiting the execution of judging the passing property of the second user by the second judging means when the second wireless ticket is judged to be the same as the first wireless ticket by the third judging means; and control means for executing the judging a passing property of the second user by the second judging means when the second wireless ticket is judged differing from the first wireless ticket by the third judging means.

DETAILED DESCRIPTION OF THE PREFERRED EMBODIMENT

The first embodiment of the present invention will be described below with the reference to the drawings.

Ticket media that are processing objects of the automatic ticket checking apparatus of the present invention are magnetic tickets and wireless communication type tickets. Further, magnetic tickets are restricted to one size tickets only. Wireless communication type tickets cover tickets in kinds differing from the magnetic tickets restricted to a single size.

For example, the magnetic tickets that are objects for the process by the automatic ticket checking apparatus of the present invention are limited to Edomondson size (57.5 mm×30 mm). In addition, magnetic tickets that are objects for the process are limited to tickets that are effective for one-day only. In other words, magnetic tickets that become objects for the process are limited to ordinary tickets only. Further, wireless communication type tickets that are objects for the process by the automatic ticket checking apparatus of the present invention include commutation tickets (57.5 mm×85 mm) that are approved to take a train for a prescribed section in a prescribed period, pre-paid type tickets (SF tickets) (57.5 mm×85 mm) approved to take a train against a pre-recorded amount information, and long-distance tickets (long-distance tickets) (57.5 mm×120 mm) approved take a train for a long distance exceeding the above mentioned prescribed distances.

As described above, by limiting kinds of magnetic tickets (by limiting to ordinary tickets only), it becomes also possible to limit data amount recorded on magnetic tickets and as a result, it is possible to limit magnetic tickets to Edomondson size only. Although the method is differing from this, it is also possible to limit magnetic tickets to Edomondson size only by changing a data recording system. For example, instead of an NR1 (non return to zero 1) system that has a low recording density, adopt an FM system that has a high recording density and requiring no CP track. Thus, it becomes possible to record data in relatively large capacity on even Edomondson size magnetic tickets. As a result, magnetic tickets in Edomondson size can be issued for long-distance tickets containing special express information.

Figure 1:
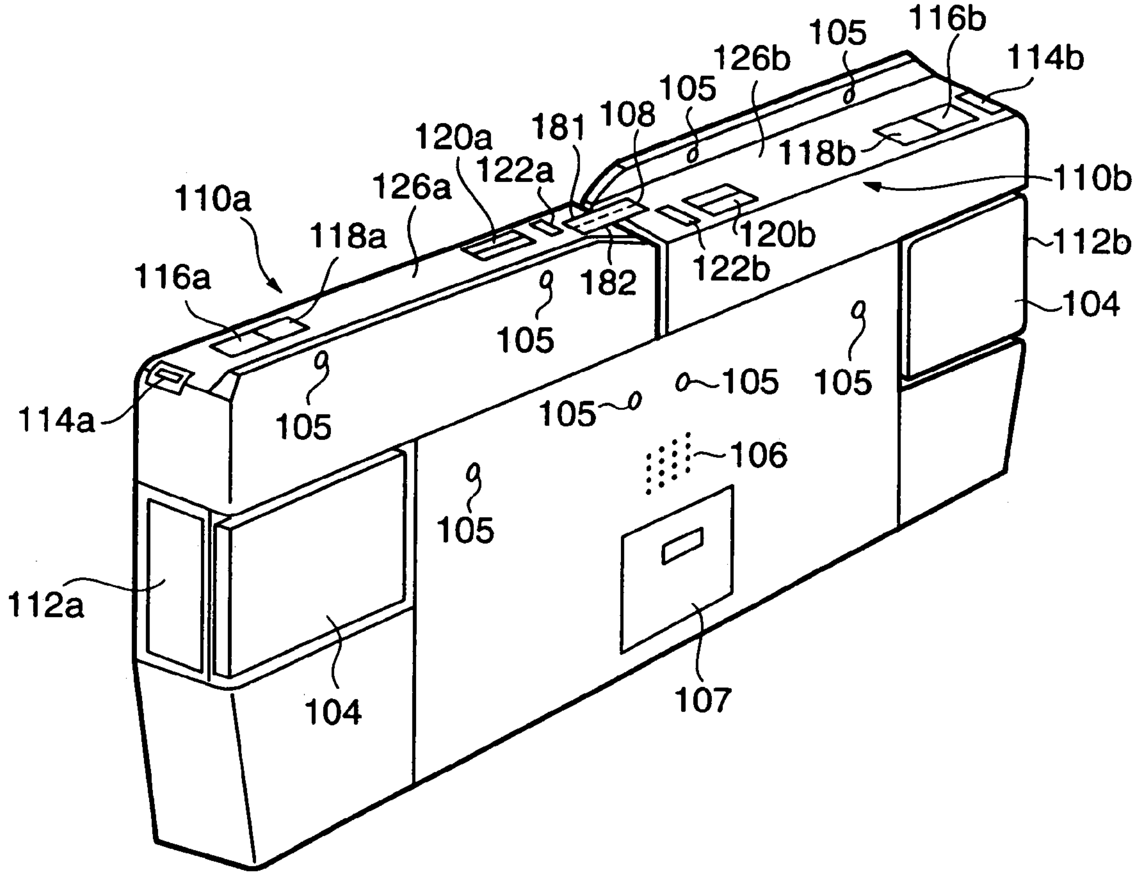
FIG. 1 is a perspective view showing the outline of the external appearance of an automatic ticket checking apparatus as a first embodiment of the present invention.
Figure 2:
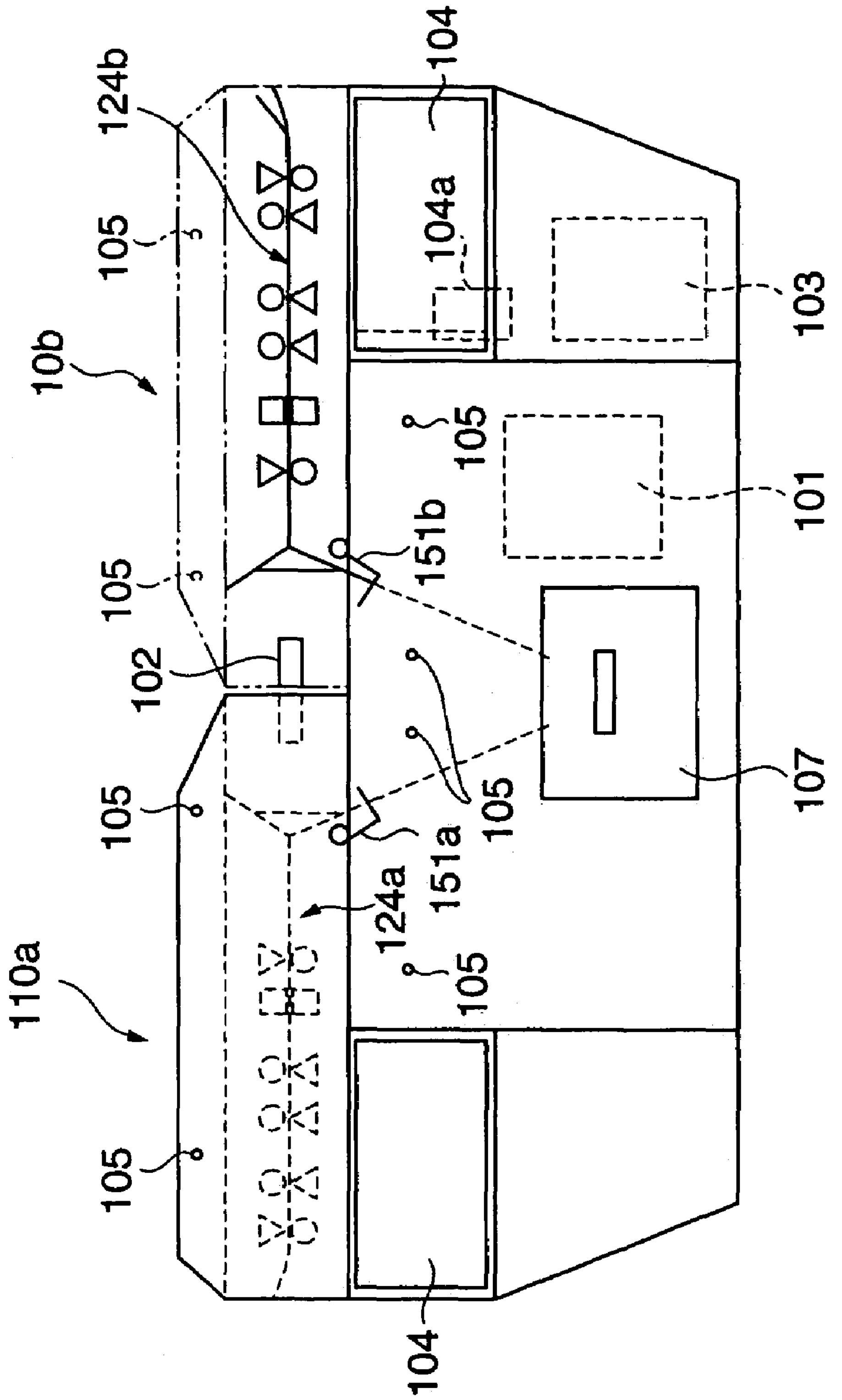
FIG. 2 is a sectional view showing the outline of the internal structure of the automatic ticket checking apparatus shown in FIG. 1.

FIG. 1 is a perspective view showing the outline of the external appearance of the automatic ticket checking apparatus as a first embodiment of the present invention. FIG. 2 is a sectional view showing the outline of the internal structure of the automatic ticket checking apparatus of the present invention. As shown in FIGS. 1 and 2, the automatic ticket checking apparatus is provided with a main controller 101, control panel 102, power source unit 103, door 104, sensor 105, speaker 106, collector 107, common display 108, checking processor 110*a* and checking processor 110*b*.

The main controller 101 controls the entire automatic ticket checking apparatus. The control panel 102 is a pan 1 that is operated by a maintenance person who performs the maintenance of this automatic ticket checking apparatus. The door 104 is opened/closed by a door opening/closing driver 104*a*. The sensor 105 senses a user who is passing the side of the automatic ticket checking apparatus, that is, a user who passes through the ticket checking passage. The speaker 106 outputs various kinds of voice guidance to users. The collector 107 has a collection box and collects magnetic tickets that are no long required in this collection box. The common display 108 displays the guidance relative to the checking process by a checking processor 110*a* and that relative to the checking process by a checking process 110*b*. This common display 108 will be described later in detail.

The checking processor 110*a* is provided with a medium processing mechanism. In order words, the checking processor 110*a* is equipped with a passage display 112*a*, an insert port 114*a*, a wireless communicator 116*a*, a guidance display 118*a*, a checking result indicating display 120*a*, a take-out port 122*a*, and a conveying mechanism 124*a*. The passage display 112*a* displays various kinds of guidance for a user (passenger) who is passing through the passage along the automatic ticket checking apparatus. The insert port 113*a* is a mechanism provided near one and of the housing of the automatic ticket checking mechanism for receiving magnetic tickets that are inserted by users. The wireless communicator 116*a* communicates with a wireless ticket held up by a user, receives data transmitted from a wireless ticket and transmits data to a wireless ticket. The guidance display 118*a* displays various kinds of guidance to users. The checking result indicating display 120*a* displays the checking result of approval/disapproval of the passing. Further, it is also possible to eliminate this checking result indicating display 120*a* from the equipment configuration by displaying the contents to be displayed on the common display 108 instead of displaying them on the checking result indicating display 120*a*. The take-out port 122*a* ejects the magnetic ticket received through the insert port 114*a*. That is, a magnetic ticket is returned to a user through this port. The conveying mechanism conveys the magnetic ticket received through the insert port 114*a* to the take-out port-122*a* or the collection box of the collector 107.

The checking processor 10*b* is provided with a medium processing mechanism. In other words, the checking processor 110*b* is equipped with a passage display 112*b* (not visible on the drawing as it is a perspective view), an insert port 114*b*, a wireless communicator 116*b*, a guidance display 118*b*, a checking result indicating display 120*b*, and a conveying mechanism 124*b*. On the passage display 112*b*, various kinds of guidance for users who pass the passage along the automatic ticket checking apparatus are displayed. The insert port 114*b* is a mechanism provided near the other end of the housing of the automatic ticket checking apparatus (at the opposite side to the insert port 114*a*) for receiving magnetic tickets that are inserted by users. The wireless communicator 111*b* communicates with a wireless ticket that is held up by a user and receives data transmitted from the wireless ticket or transmits data thereto. The guidance display 118*b* displays various kinds of guidance to users. The checking result indicating display 120*b* displays the checking result for approval/disapproval of passing. Further, it is also possible to eliminate this checking result indicating display 120*a* from the equipment configuration by displaying the contents to be displayed thereon on the common display 108 instead of displaying them on the checking result indicating display 120*a*. The take-out port 122*b* ejects the magnetic ticket received through the insert port 114*b*. That is, the magnetic ticket is returned to a user. The conveying mechanism 124*b* convoys the magnetic ticket received through the insert port 114*a* to the take-out port 122*b* or the collection box of the collector 107.

The portion from near one end of the housing of the automatic ticket checking apparatus to nearly the center, that is, a part (the conveying mechanism 124*a*) of the checking processor 110*a* is covered by a top cover 126*a*. This top cover 126*a* is provided to be able to open/close it to the automatic ticket checking apparatus. On this top cover 126*a*, there are provided the insert port 114*a*, wireless communicator 116*a*, guidance display 118*a*, checking result indicating display 120*a* and take-out port 122*a*. Similarly, the portion from near the other end of the automatic ticket checking apparatus to nearly the center of the automatic ticket checking apparatus, that is, a part of the checking processor 110*b* (the conveying mechanism 124*b*) is covered by a top cover 126*b*. This top cover 126*b* is provided so as to be able to open/close to the automatic ticket checking apparatus. On this top cover 126*b*, there are provided the insert port 114*b*, the wireless communicator 116*b*, the guidance display 118*b* and the checking result indicating display 120*b*.

Figure 6:
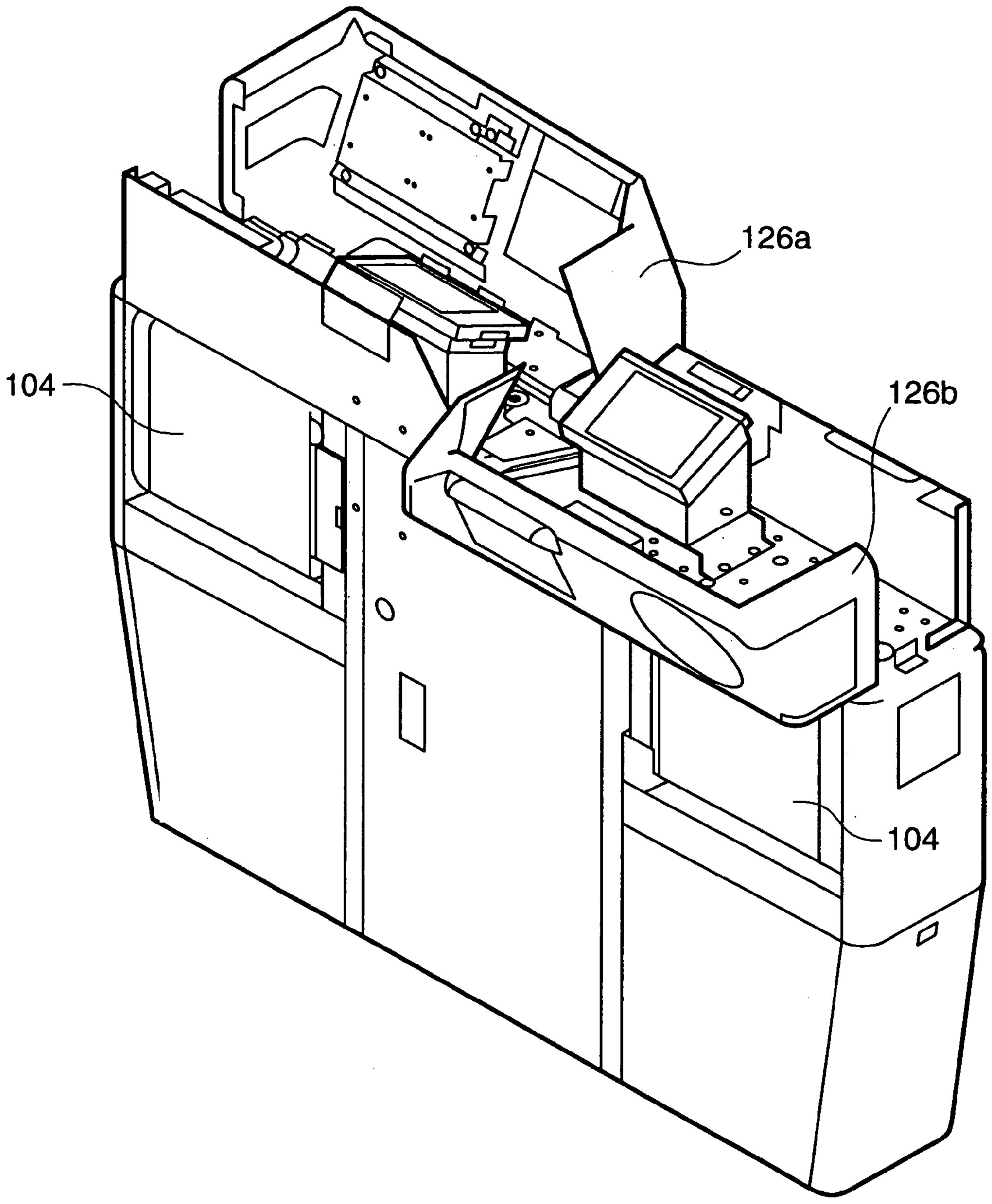
FIG. 6 is a perspective view showing the automatic ticket checking apparatus in the state when the top cover is opened.

The top cover 126*a* opens to one side of the passage separated by this automatic ticket checking apparatus and the top cover 126*b* opens to the other side of the passage separated by this automatic ticket checking apparatus (see FIG. 6). Thus, even when one of the top cover is opened and the other passage become unusable, the other passage will not become unusable. For example, assume that the housing of the automatic ticket checking apparatus is installed along and between a first and second ticket checking passages. At this time, the top cover 126*a* open to the first checking passage and does not impede the passage of the second checking passage. Similarly, the top cover 126*b* opens to the second checking passage side and does not impede the passing of the first checking passage. Accordingly, it becomes possible to perform the checking process by the checking processor 110*b* (the use of the second checking passage) while performing the maintenance of the medium processing mechanism of the checking processor 110*b* with the top cover 126*a* opened. Similarly, it becomes possible to perform the checking process (the use of the first checking passage) while performing the maintenance of the medium processing mechanism of the checking processor 110*b* with the top cover 126*b* opened and does not impede the passing of the second checking passage.

Figure 3:
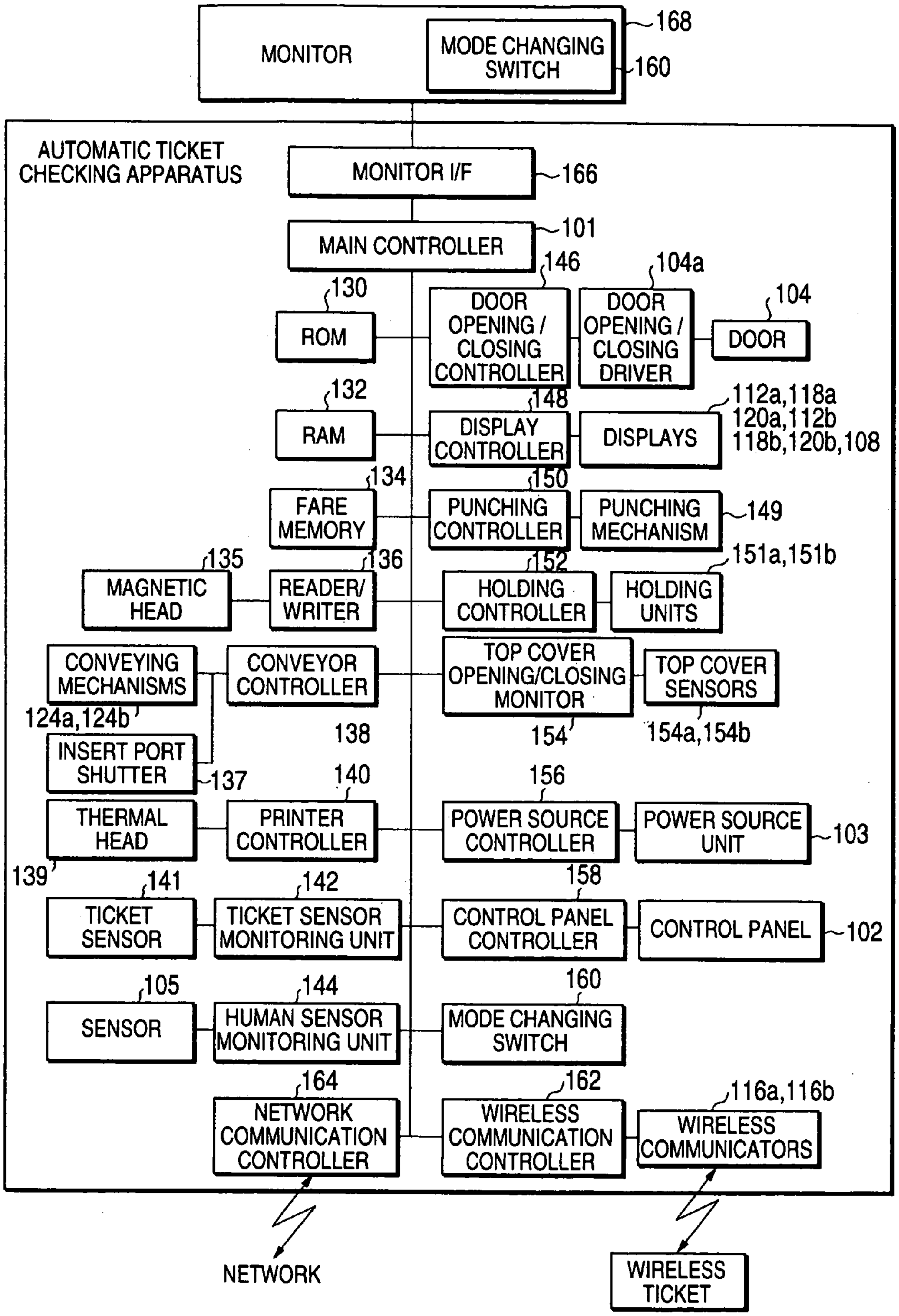
FIG. 3 is a block diagram showing the schematic structure of the automatic ticket checking apparatus shown in FIG. 1.

The actions, etc. of the automatic ticket checking apparatus of the present invention will be described in succession referring to FIG. 3. FIG. 3 is a block diagram showing the outline of the construction of the automatic ticket checking apparatus of the present invention. As shown in FIG. 3, the automatic ticket checking apparatus of the present invention is provided with a main controller 101, ROM 130, RAM 132, fare memory 134, reader/writer 136, conveyor controller 138, printer controller 140, ticket sensor monitoring unit 142, human sensor monitoring unit 144, door opening/closing controller 146, display controller 0.148, punching controller 150, holding controller 152, top cover opening/closing monitor 154, power source controller 156, control panel controller 158, mode changing switch 160, wireless communication controller 162, network communication controller 164, monitor I/F 166, etc.

The main controller 101 controls the entire automatic ticket checking apparatus as described above. The ROM 103 stores a control program etc. of the main controller 101. The RAM 132 temporarily stores data generated when the main controller 101 controls the automatic ticket checking apparatus. The fare memory 134 stores fare data. The reader/recorder 136 controls a reading/recording magnetic head, reads data magnetically recorded on magnetic tickets and/or magnetically records prescribed data on magnetic tickets. The conveyor controller 138 controls the conveying of magnetic tickets by the conveying mechanisms 124*a* and 124*b*. In addition, this conveyor controller 138 controls an insert port shutter provided at the insert ports 114*a* and 114*b* and prohibits the insert of magnetic tickets. The print controller 140 prints and records prescribed data on a magnetic ticket by controlling a thermal head 139.

The ticket sensor monitoring unit 142 checks ticket sensor signals from a plurality of ticket sensors 141 provided along the conveying mechanisms 124*a* and 124*b* and monitors the conveying state of magnetic tickets by the conveying mechanisms 124*a* and 124*b*. The human sensor monitoring unit 144 checks a human sensing signal from the sensor 105 and monitors persons who are passing along the automatic ticket checking apparatus. The door opening/closing controller 146 controls the opening/closing of the door 104 by the door opening/closing driver 104*a*. The display controller 148 controls the displays of various displays such as the common display 108, the passage display 112*a*, the guidance display 118*a*, the checking result indicating display 120*a*, the passage display 112*b*, the guidance display 118*b*, the checking result indicating display 120*b*, etc. The punching controller 150 controls the punching process timing, etc. by a punching mechanism 149 which is provided at a prescribed position along the conveying mechanisms 124*a* and 124*b*. The holding controller 152 controls the holding of magnetic tickets by holding units 151*a* and 151*b* provided at the prescribed positions of the conveying mechanisms 124*a* and 124*b*. A top cover opening/closing monitor 154 checks a sensor signal from a top cover sensor 154*a* which senses the opening/closing state of the top cover 126*a* and a sensor signal from a top cover sensor 154*b*which senses the opening/closing state of the top cover 126*b*, and monitors the opening/closing state of the top covers 126*a* and 126*b*. The power source controller 156 controls the power supply and the like by the power source unit 103.

The control panel controller 158 controls the automatic ticket checking apparatus based on a set value, etc. that are input from the control panel 102. In other words, the control panel 102 is capable of performing the maintenance of the ticket checking mechanism and the ticket collecting mechanism collectively. Further, this switching of a maintenance object by the control panel 102 is controlled by the control panel controller 158. For example, when the top cover 126*a* only is kept open (the state of the top cover opening/closing is monitored by the top cover opening/closing monitor 154), the control panel controller 158 switches the maintenance object by the control panel 102 to the checking processor 110*a*. On the contrary, when the top cover 126*b* only is kept open, the control panel controller 158 switches the maintenance object by the control panel 102 to the checking processor 110*b*. Further, when both of the top covers 126*a* and 126*b* are kept open, the control panel controller 158 switches the maintenance objects by the control panel 102 to both the checking processors 110*a* and 110*b*. In addition, a key to accept a designation for selecting the maintenance control object is provided on the control panel, and a maintenance person is able to select and designate an object for maintenance.

The mode change switch 160 switches the mode of the automatic ticket checking apparatus. There are such modes as a magnetic ticket only mode, a wireless ticket only mode and a combined mode. When the mode is switched to the magnetic ticket only by the mode change switch 160, the object for the ticket checking process and ticket collection process by the automatic ticket checking apparatus becomes magnetic tickets only. At this time, the guidance indicating that the object of process is only magnetic ticket is displayed on he passage displays 112*a* and 112*b*. In this case, a ticket is an effective wireless ticket, the passing is not approved. When the mode is changed to the wireless ticket only mode by the mode change switch 160, the object of ticket checking process and the ticket collection process by the automatic ticket checking apparatus is changed to the wireless tickets only and at this time, the guidance is displayed on the passage displays 112*a* and 112*b* indicating that wireless tickets only is processed on the passage displays 112*a* and 112*b*. Further, the insert port shutters provided at the insert ports 114*a* and 114*b* are closed so that magnetic tickets can not be inserted into the insert ports 114*a* and 114*b*. When the mode is switched to the combined mode by the mode chanting switch 160, both magnetic tickets and wireless tickets become the object for the ticket checking process and the ticket collection process by the automatic ticket checking apparatus. At this time, the guidance that the objects for process are both magnetic tickets and wireless tickets is displayed on the passage displays 112*a* and 112*b*.

The wireless communication controller 162 controls transmission/receiving power, etc. of the wireless communicators 116*a* and 116*b*, demodulates data received by the wireless communicators 116*a* and 116*b*, and modulates data to be transmitted from the wireless communicators 116*a* and 116*b*. The network communication controller 164 controls the communication with external networks. The monitor I/F functions as an interface of the automatic ticket checking apparatus combined with the monitor 166 that is externally installed. Further, the monitor 166 is also provided with the mode change switch 160 that is described above. The mode change switch 160 provided to this monitor 166 is able to change a mode for every automatic checking process.

Here, the holding units 151*a* and 151*b* and the collection box of the collector 107 will be explained in detail. Magnetic tickets conveyed by the conveying mechanisms 124*a* and 124*b* are collected in the collection box collectively. In other words, this automatic ticket checking apparatus is not provided with a collection box for the conveying mechanism 124*a* and that for the conveying mechanism 124*b*, independently but is provided with one common collection box for the conveying mechanisms 124*a* and 124*b*. As a result, the cost of the automatic ticket checking apparatus can be reduced. Further, this collection box is in such structure that it can be taken out from both sides of the passage of the automatic ticket checking apparatus. For example, if the housing of the automatic ticket checking apparatus is installed along the first and second ticket checking passages and between them, the ticket collection box can be taken out from either the first ticket checking passage side or the second ticket checking passage side. Accordingly, while the collection box is being taken out from the first ticket checking side passage, the second ticket checking passage can be used. Similarly, while taking out the collection box from the second ticket checking passage side, the first ticket checking passage can be used.

Further, there is provided a sensor in the automatic ticket checking apparatus for sensing the collection box. By monitoring the output from this sensor, it is possible to check whether the collection box is taken out of the apparatus. While the collection box is being taken out, the holding controller 152 controls the holding mechanisms 151*a* and 151*b* and magnetic tickets to be collected are held temporarily. Thus, even when the collection box is being taken out from one passage side, the checking process using the other passage becomes possible. Further, while monitoring the output from the ticket sensor 141 provided along the conveying mechanisms 124*a* and 124*b*, it is possible to know the number of sheets of magnetic tickets which are held by the holding mechanisms 151*a* and 151*b*. There is an upper limit for the number of magnetic tickets that can be held by the holding mechanisms 151*a* and 151*b*. When the holding capacity of the holding mechanisms 151*a* and 151*b* reaches the saturated state, the insert port shutter 137 is closed so as to prohibit acceptance of magnetic tickets. Thus, the clogging of magnetic tickets in the holding mechanisms 151*a* and 151*b* can be prevented.

Figure 4:
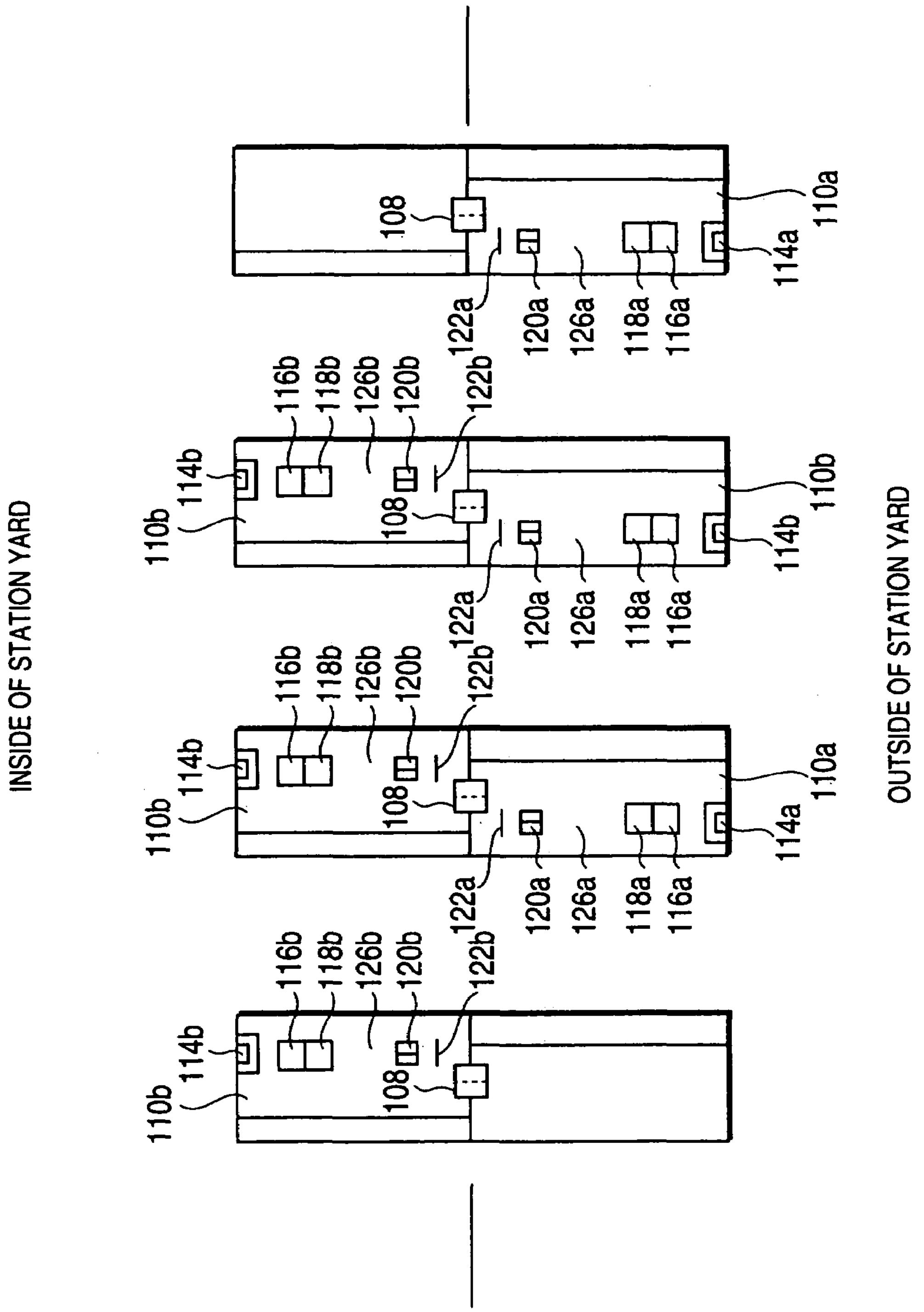
FIG. 4 is a plan view showing an example of the installation of the automatic ticket checking apparatus shown in FIG. 1.

In succession, an example of the installation of the automatic ticket checking apparatus shown above will be explained referring to FIG. 4. FIG. 4 is a diagram showing a plurality of automatic ticket checking apparatus installed viewed from above as an example of the installation of the automatic ticket checking apparatus. As shown in FIG. 4, a plurality of automatic ticket checking apparatus is installed at the boundary of the outside and the inside of a station yard. At this time, a space between two units of the automatic ticket checking apparatus becomes a passage. In other words, the housing of the automatic ticket checking apparatus is installed along the ticket checking passage. Further, an automatic ticket checking apparatus equipped with only one of the checking processors 110*a* and 110*b* is installed for the automatic ticket checking apparatus at both ends.

For example, assume that an automatic ticket checking apparatus is installed along the first and second ticket checking passages and between them. The insert port 114*a*, the wireless communicator 116*a*, the guidance display 118*a*, the checking result indicating display 120*a* and the take-out port 122*a* are provided at positions that are one-sided to one of the ticket checking passage side (the first ticket processing side) from the center line of the housing of the automatic ticket checking apparatus as shown in FIG. 4. Further, the insert port 114*b*, the wireless communicator 114*b*, the guidance display 118*b*, the checking result indicating display 120*b* and the take-out port 122*b* on the automatic ticket checking apparatus are provided at the positions that are one-sided to the other checking passage side (the second processing passage side) from the center line of the housing along the checking passage as shown in FIG. 4. As a result, users who pass through the passages are able to get the checking process by prescribed checking processor 110*a* or 110*b* adapting to respective passage (the checking process by the checking processor 110*a* or 110*b* adapting to a separate passage is prevented).

To get a magnetic ticker checked, a user enters into the passage from the outside of the station yard and inserts a magnetic ticket into the insert port 114*a* provided near one end of the housing of the automatic ticket checking apparatus. The inserted magnetic ticker is conveyed by the conveying mechanism 124*a*. To explain more in detail, this conveying mechanism 124*a* is a mechanism provided for the section extending from near one end of the housing to almost the center along the ticket checking passage and conveys the magnetic ticket received through the insert port 114*a* in the first direction along the ticket checking passage from one end of this housing to near the center. This first direction is a direction toward the inside of the station yard from the outside of the station yard. During the conveyance, data recorded on the magnetic ticket is read by the reading/recording magnetic head 135 and prescribed data is recorded on the magnetic ticket as necessary. The main controller 101 checks the approval/disapproval of passing based on the data read from the magnetic ticket and the data recorded in the fare memory. 134. When the passage is approved, the magnetic ticket is punched and printed as necessary and ejected through the take-out port 122*a* provided at the nearly center of the housing. At this time, the ticket take-out guidance is displayed on the checking result indicating display 120*a* and the same guidance is output in the voice through the speaker 106. When the passage is disapproved, the magnetic ticket is ejected 122*a* as it is and the door 104 is closed to check a user to pass (the entrance to the station yard). At this time, the checking result indicating display 120*a* displays that the ticket is improper and the ticket pull-out guidance, etc. and the same voice guidance is output from the speaker 106.

To get a wireless ticket checked, a user enters into the passage from the outside of the station yard and brings the ticket over the wireless communicator 116*a*. At this time, data recorded on the wireless ticket is read through the communication between the wireless ticket and the wireless communicator 116*a* and prescribed data is recorded on the wireless ticket as required. The main controller 101 checks the approval/disapproval of the passage based on the data read from the wireless ticket and the data recorded in the fare memory 134. When the passage is approved, the checking result indicating display 120*a* displays the guide for approval of passage and the same guide is output in the voice through the speaker 106. When the passage is disapproved, the door 104 is closed and the passage of a user is checked (the entry into the station yard) At this time, the checking result indicating display 120*a* displays the guidance that the ticket is improper and the same guidance is output in the voice through the speaker 106.

To get a magnetic ticket checked, a user enters into the passage from the outside of the station yard and inserts a magnetic ticket into the insert port 114*b* provided near one end of the housing of the automatic ticket checking apparatus. The inserted magnetic ticket is conveyed by the conveying mechanism 124*b*. To explain more in detail, this conveying mechanism 124*b* is a mechanism provided for the section extending from near the other end to near the center of the housing along the ticket checking passage and conveys the magnetic ticket received through the insert port 114*b* from near the other end to near the center of the housing in the second direction along the ticket checking passage. This second direction is that direction toward the outside of the station yard from its inside and the direction opposite to the first direction mentioned above. During the conveyance, the data recorded on the magnetic ticket is read by the reading/recording magnetic head 135 and prescribed data is recorded on the magnetic ticket as required. The main controller 101 checks the approval/disapproval of the passing based on the data read from the magnetic ticket and the data recorded in the fare memory 134. When the passage is approved, the magnetic ticket is collected in the collection box of the collector 107. Thus, when the checking process approves the passing, a magnetic ticket is collected in the collection box of the collector 107 without returning to a user. So, the take-out mechanism such as the take-out port 122*b* to eject magnetic tickets can be eliminated. When the passing is disapproved, a magnetic ticket is ejected (returned) from the take-out port 122*b*. When an ejection mechanism such as the take-out port 122*b* is not provided, the ticket may be returned to a user through the insert port 114*b* or held in the holding mechanism 151*b* for dealing by a station attendant. In this case, the door 104 is closed and the passing of a user is checked (prohibited to exit to the outside of the station yard). At this time, the checking result indicating display 120*b* displays the guidance that the ticket is improper, the guidance for ticket take-out, etc. and the same guidance is output in the voice through the speaker 106.

To get a wireless ticket processed for collection a user enters into the passage from the inside of the station yard and brings a wireless ticket over the wireless communicator 116*b*. At this time, the data recorded on the wireless ticket is read through the communication between the wireless ticket and the wireless communicator 116*b* and when needed, a prescribed data is recorded on the wireless ticket. The main controller 1012 checks the approval/disapproval of the passing based on the data read from the wireless ticket and the data recorded in the fare memory 134. When the passing is approved, the checking result indicating display 120*b* displays the guidance that the passing is approved and the same guidance is output in the voice through the speaker 106. When the passing is disapproved, the door 104 is closed and the passing of a user is checked (inhibited to exit to the outside of the station yard). At this time, the checking result indicating display 120*b* displays that the ticket is improper and the same guidance is output in the voice through the speaker 106.

When the passing is disapproved commonly in all the above cases, the equipment number of the automatic ticket checking apparatus that disapproved the passing is notified to a monitor 168.

Here, the arrangement of the magnetic head 135 will be explained. One surface of the magnetic ticket is a magnetic recording surface on which magnetic information is recorded magnetically and the other surface is a printing/recording surface on which characters and other information are printed and recorded. In the automatic ticket checking apparatus, the magnetic head 135 is so arranged that even when a ticket is inserted with the magnetic recording surface faced downward or upward, it is possible to process the ticket.

The arrangement of the magnetic heads 135 will be explained. In this arrangement, the magnetic head 135 for reading/recording when a ticket is inserted with the magnetic recording surface faced downward is arranged along the conveying mechanisms 124*a* and 124*b*. Further, the magnetic head 135 for reading/recording when a magnetic ticket is inserted with the magnetic recording surface faced upward is arranged along the conveying mechanisms 124*a* and 124*b*. This arrangement of the magnetic heads 135 makes it possible to cope with tickets even when they are inserted with the magnetic recording surfaces faced downward or upward. Further, in the checking processor 110*b*, the recording magnetic head 135 may be omitted (a magnetic head for recording is not provided). This is because it is not required to record data on magnetic tickets particularly. Punching them with the punching mechanism 149 may distract the magnetic recording portions of the magnetic tickets that are collected in the collector 107. When the recording magnetic head 135 is not provided in the checking processor 110*b*, the equipment configuration can b simplified.

The arrangement of the magnetic heads will be explained. In this arrangement, the magnetic head 135 for recording data when a ticket is inserted with the magnetic recording surface faced downward is provided along the conveying mechanisms 124*a* and 124*b*. Further, the magnetic head 135 for recording when a ticket is inserted with the magnetic recording surface faced upward is arranged along the conveying mechanisms 124*a* and 124*b*. Thus, even when a ticket in inserted with the recording surface faced downward or upward, the ticket can be processed. On the other hand, the magnetic head 135 for recording is arranged along the conveying mechanisms 124*a* and 124*b* only for tickets with the magnetic recording surface faced upward. Tickets that are inserted with this magnetic recording surface faced downward or upward can be coped with only by this magnetic head 135. When a ticket is inserted with the magnetic recording surface faced downward, there is no problem. When it is inserted with the magnetic recording surface faced upward, the output of read information becomes small. This is because the magnetic recording surface is position far away from the magnetic head and the magnetic output becomes less due to an effect of space loss. In this case, if the output current that is the reading result was lower than a prescribed value when monitored, it is possible to change a gain of a reading amplifier to a higher output magnification and thus, recorded data can be read. Further, in the checking processor 110*b*, the recording magnetic head 135 may be omitted similarly to the arrange of the magnetic head as described above (the recording magnetic head is not provided). Similarly to the arrangement of the magnetic head as described above, punching it with the punching mechanism 149 may destruct the magnetic recording portion. When the recording magnetic head 135 is not provided in the checking processor 110*b*, the equipment configuration can be simplified.

Figure 5:
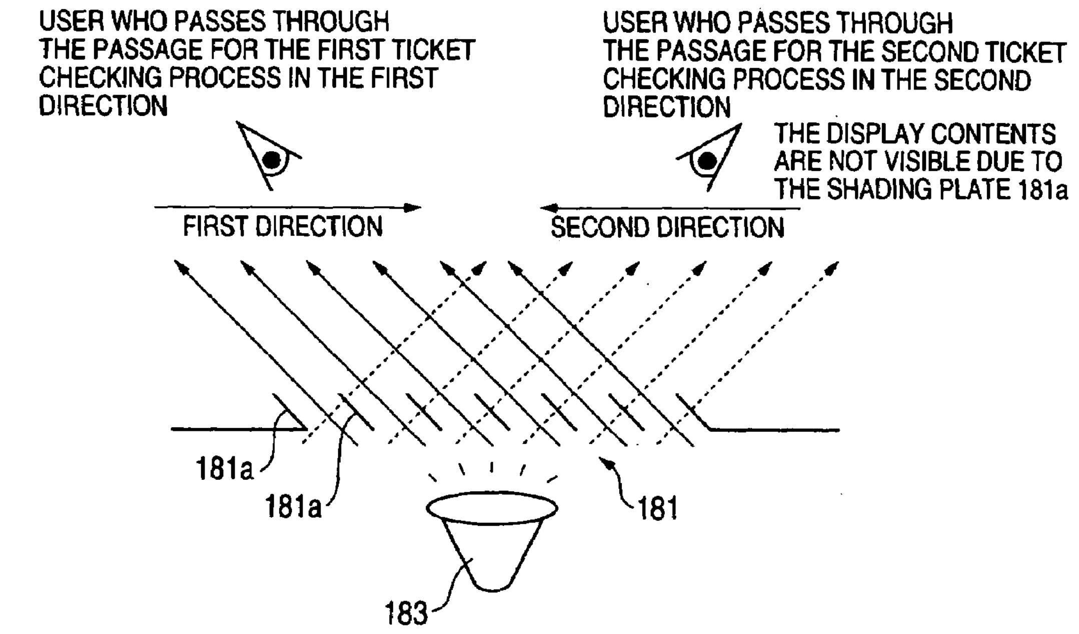
FIG. 5 is an outline diagram for explaining the action and effect of a shading plate provided in a common display on the automatic ticket checking apparatus shown in FIG. 1.
Figure 5:
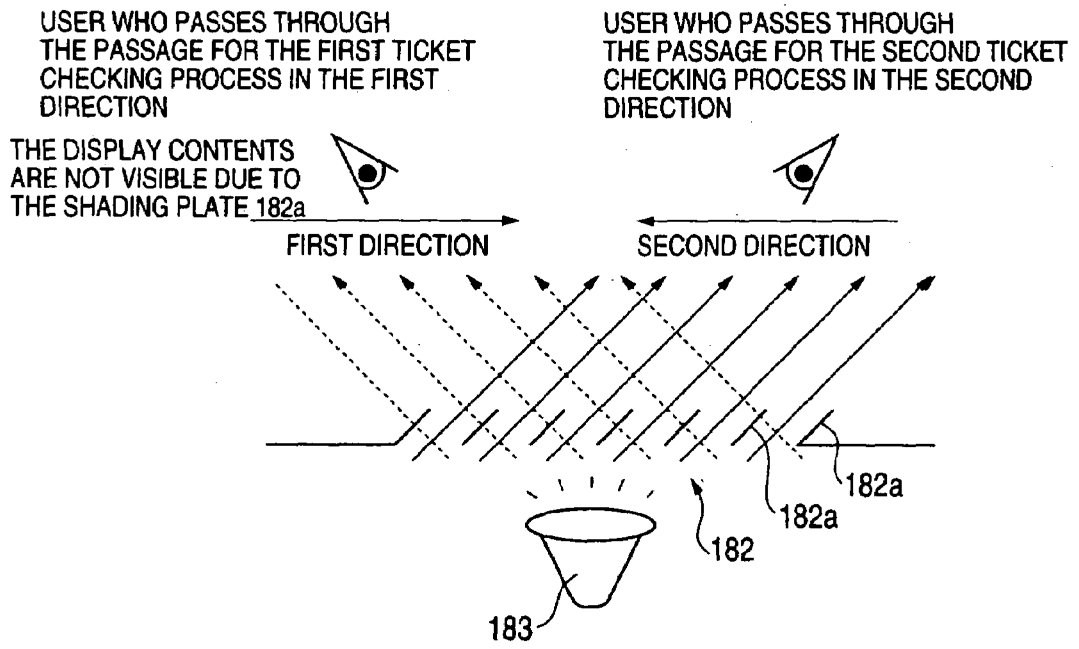

In succession, the common display 108 will be explained in detail. For the purpose of explanation, it is assumed that an automatic ticket checking apparatus was arranged along the first and second checking process passages and between them. It is further assumed that this automatic ticket checking apparatus performs the checking process for users who pass through the first checking process passage and the checking process for users who pass the second checking passage. The common display 108 displays various guidance for users who pass through these first and second checking passages. This common display 108 has a first display 181 which gives directivity to users who pass the first checking passage and a second display 182 which gives directivity to users who are passing the second checking passage so that users who are passing both passages do not confuse the guidance displayed on the common display 108 as shown in FIG. 1. FIG. 5 is a diagram for explaining directivity of the first display 181 and the second display 182 of the common display 108. As shown in FIG. 5, the first display 181 is provided with a shading plate 181*a* which is for giving directivity to a user who passes through the first checking passage. The second display 182 is provided with a shading plate 182*a* that is for giving directivity to a user whom passes through the first checking passage. The light from a light source 183 reaches a user passing the first checking passage in the first direction by the shading plate 181*a* but does not reach a user passing through the second checking passage in the second direction. On the contrary, the light from the light source 183 reaches a user passing through the second checking passage in the second direction by the shading plate 182*a* but does not each a user passing through the first checking passage in the first direction. Thus, by providing the shading plates, it becomes possible to avoid the confusion of the guidance displayed on the common display 108 by users passing both passages.

In the above, the cases to give the directivity of the passage by providing a separate shading plate to respective displays by dividing the common display 108 into the first display 181 and the second display 182 are explained. However, the present invention is not restricted to this. For example, a shading plate may be provided to the guidance display 118*a* and 118*b* to give directivity. Further, a shading plate may be provided to the checking result indicating displays 120*a* and 120*b* so as to give directivity. In addition, the displays provided on the upper surface of the automatic ticket checking apparatus of the present invention control the upper and lower directions (the top and bottom) of the display contents by considering the advancing direction of users.

Figure 7:
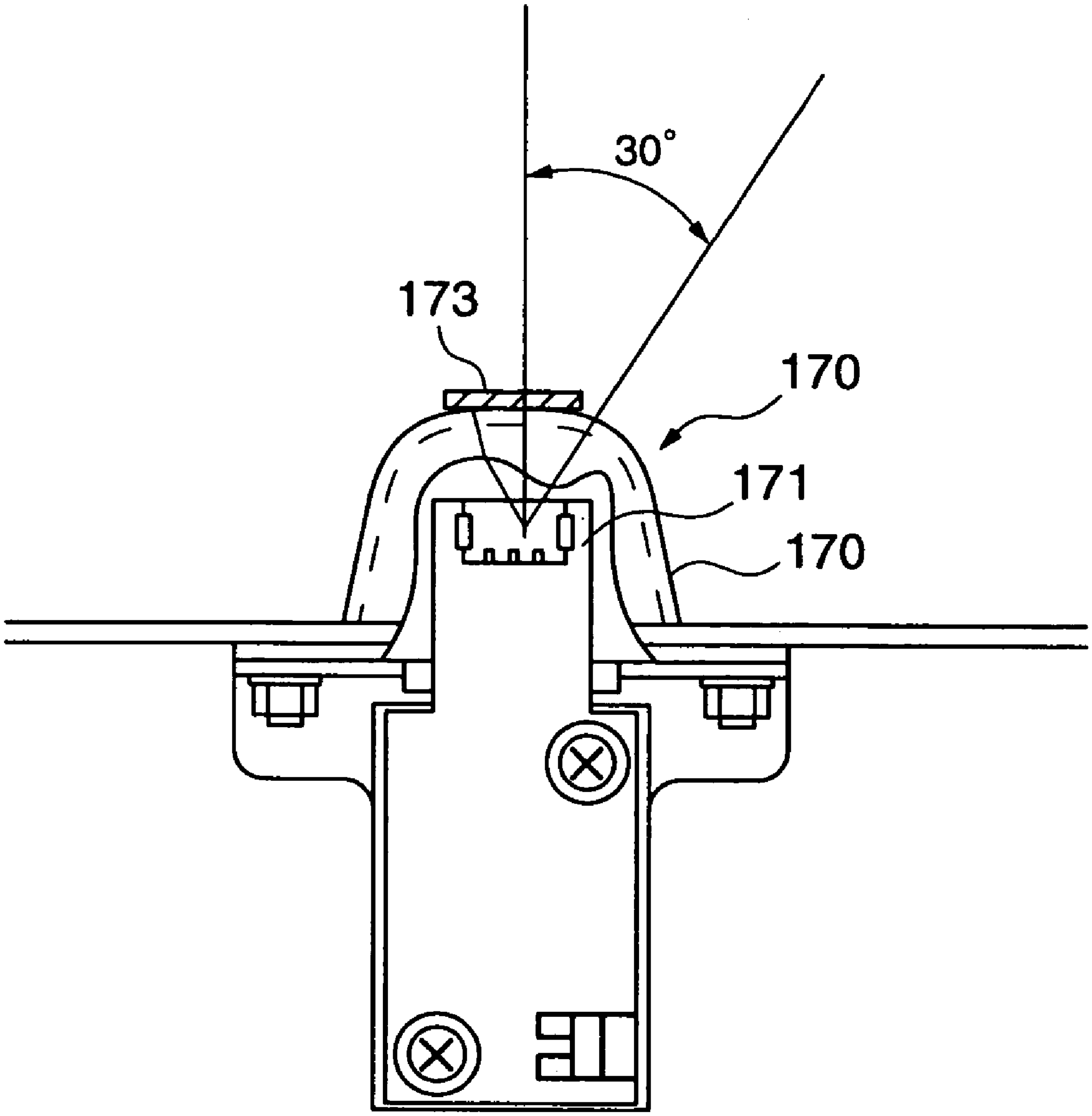
FIG. 7 is an outline diagram showing a remote control signal receiving unit provided in the automatic ticket checking apparatus shown in FIG. 1.

Further, such a remote control signal receiver 170 as shown in FIG. 7 may be provided to the automatic ticket checking apparatus to receive a control signal from a remote controller (not shown). This remote control signal receiver 170 is provided on the top of the automatic ticket checking apparatus. For example, it is provided on the upper wall surface where the sensor 105 is provided. The automatic ticket checking apparatus may become necessary to reset for some error and restart it. In such a case, the automatic ticket checking apparatus is reset through the control panel 102 which is provided thereon or can be reset from the remote controller so as to be able to control remotely.

The remote control signal 170 shown in FIG. 7 is provided with a light-receiving element 171 to receive a signal from the remote controller. This light receiving element 171 has an about 30° signal receiving area in the vertical direction as shown in FIG. 7. However, with this light-receiving element, a control signal transmitted from the remote control from the horizontal direction cannot be well received. So, the light receiving element 171 is covered by a milk white acrylic cap 172 and furthermore, a shading plate 173 is provided above this acrylic cap. The acrylic cap allows the outdoor light to transmit through it and reflects diffusely in its inside. Further, the shading plate 173 prevents the light transmitted in the acrylic cap 172 from being reflected diffusely and radiated to the outside. Thus, it becomes possible to transmit a control signal sent in the horizontal direction from the remote controller to the light-receiving element 171 sensitively.

Here, the actions and effects of the automatic ticket checking apparatus of the present invention explained above are summarized.

(1) Magnetic tickets adapting to the automatic ticket checking apparatus of the present invention are limited to one size. For example, tickets are limited to Edomondson size that is smaller than the commutation ticket size. In addition to that, all of wireless tickets in different kinds from magnetic tickets restricted to one size will be covered. Thus, it becomes no longer necessary to provide an aligning portion in the automatic ticket checking apparatus to cope with magnetic tickets in a plurality of sizes. Furthermore, the holding unit in the automatic ticket checking apparatus can be made small size (because it is no longer needed to correspond to the commutation ticket size) and a distance of the magnetic heads also can be made short (because it is also no longer needed to correspond to the commutation ticket size). As a result, the automatic ticket checking apparatus can be made small in size and a cost down is achieved. In particular, the conveying direction can be made short.

(2) As the conveying direction can be shortened as described above, it is possible to install the checking processors 110*a* and 110*b* in series along the direction of the checking passage without extending the checking passage. That is, it becomes unnecessary to install the processors in parallel along the checking passage as before.

(3) The automatic ticket checking apparatus of the present invention is so constructed that the top cover at the checking processor side opens to one passage side separated by the automatic ticket checking apparatus, and the top cover of the collection processor side opens to the other passage side. Thus, even when one of the top covers is opened, making one of the passages unusable, the other passage will not become unusable. This will prevent the working efficiency of the automatic ticket checking apparatus from dropping.

(4) The insert ports 114*a*, wireless communicator 116*a*, guidance display 119*a*, checking result indicating display 120*a* and take-out port 122*a* on the automatic ticket checking apparatus are provided at the positions one-sided to one of the checking passage side from the center line on the housing along the checking passage. The insert port 114*b*, wireless communicator 116*b*, guidance display 118*b*, checking result indicating display 120*b* and take-out port 122*b* are provided at the positions one-sided to the other checking passage side from the center line on the housing along the checking passage as shown in FIG. 4. Thus, tickets held by users who are passing through these passages can b checked and collected by the processing mechanisms adapted to respective passages. In other words, the processing or collection of tickets by the processing mechanism adapted to another passage can be prevented.

(5) One control panel is commonly used for both the ticket checking process and collection process, and objects to be controlled are switched and controlled adapting to the open/close state of the top cover by the control panel. As a result, the equipment cost can be reduced and convenience will not be impaired.

(6) As the directivity is given to the display contents by the shading plate, the display adapting to the ticket checking process as well as the ticket collection process can be used commonly. As a result, it is possible to reduce cost.

According to the present invention, an automatic ticket checking apparatus adapting to the ticket checking and collection processes and small in size can be provided.

Next, an automatic ticket checking apparatus as a second embodiment of the present invention will be explained.

Figure 8:
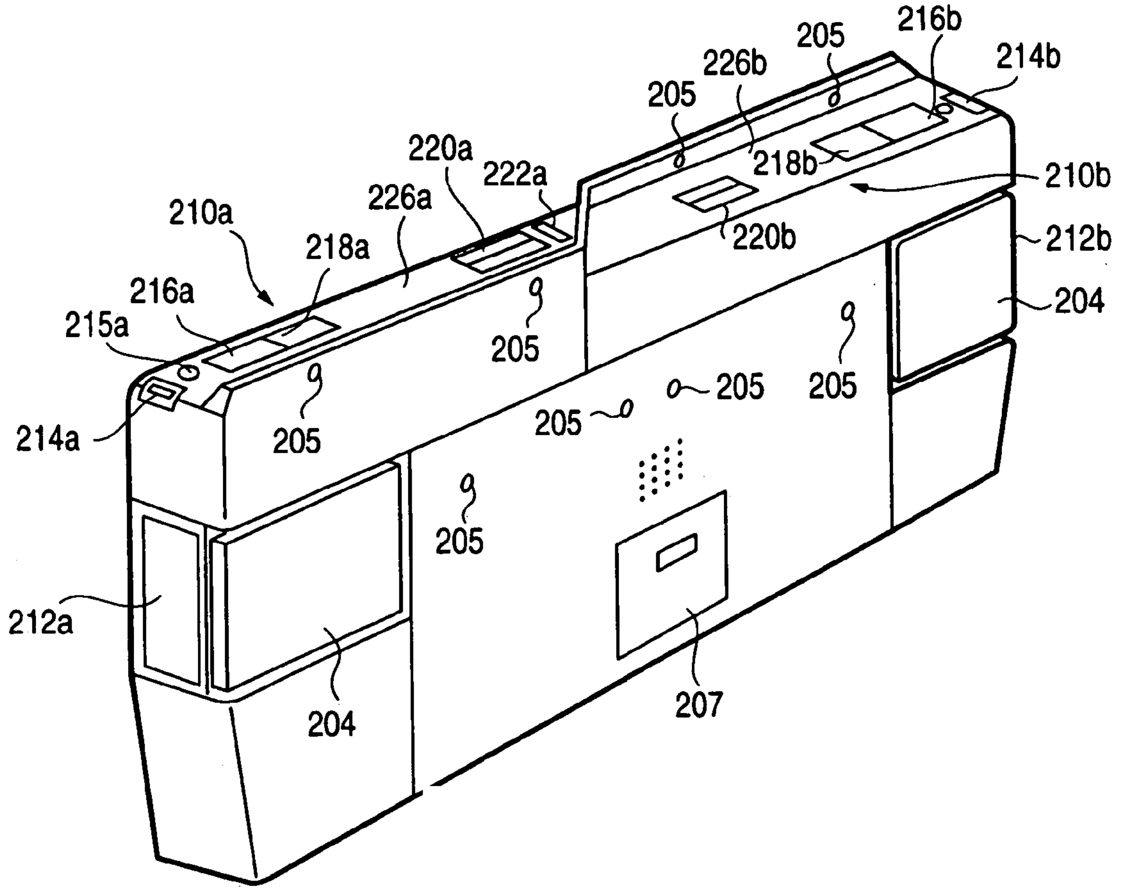
FIG. 8 is a perspective view showing the outline of the external appearance of the automatic ticket checking apparatus as a second embodiment of the present invention.

FIG. 8 is a perspective view showing the outline of the external appearance of an automatic ticket checking apparatus as the second embodiment of the present invention. As shown in FIG. 8, the automatic ticket checking apparatus is provided with the door 204, sensor 205, speaker 206, collector 207, checking processor 210*a* and checking processor 210*b*.

The door 204 closes the passage when it is closed. The sensor 205 senses users who pass through the side surface of the automatic ticket checking apparatus, that is, users who pass through the ticket checking passage. The speaker 206 outputs various voice announcements to users. The collector 207 has a collection box and collects unnecessary magnetic tickets in this collection box.

The checking processor 210*a* is provided with a ticket processing mechanism. That is, the checking processor 210*a* is provided with a passage display 212*a*, insert port 214*a*, fare adjustment key 215*a*, wireless communicator 216*a*, guidance display 218*a*, checking result indicating display 220*a*, take-out port 222*a* and conveying mechanism (not shown). The passage display 212*a* displays various kinds of guidance to users (passengers) who are passing the passages along the automatic ticket checking apparatus. The inert port 214*a* receives magnetic tickets inserted by users. The fare adjustment key 215*a* directs the fare adjustment to the main housing when the fare adjustment is required. The wireless communicator 216*a* communicates with wireless tickets held up by users, receives data transmitted from the wireless ticket or transmits data to the wireless ticket. The guidance display 218*a* displays various kinds of guidance for users. The checking result indicating display 220*a* displays the checking result for approval/disapproval of the passing. The take-out port 222*a* ejects the magnet tickets received through the insert port 214. That is, this port returns the magnetic tickets to users. The conveying mechanism (not shown) conveys the magnetic tickers received through the insert port 214*a* to the take-out port 222*a*.

The checking processor 210*b* is provided with a ticket processing mechanism. That is, the checking processor 210*b* is provided with a passage display 212*b* (not visible on the drawing which is a perspective view), inert port 214*b*, fare adjustment key 215*b*, wireless communicator 216*b*, guidance display 218*b*, checking result indicating display 220*b* and conveying mechanism (not shown). The passage display 212*b* displays various kinds of guidance for users who are passing through the passage along the automatic ticket checking apparatus. The insert port 214*b* receives magnetic tickets inserted by users. The fare adjustment key 215*b* directs the fare adjustment to the main housing of the apparatus when the fare adjustment is required. The wireless communicator 216*b* communicates with wireless tickets held up by users and receives data transmitted from the wireless tickets or transmits data to the wireless tickets. The guidance display 218*b* displays various kinds of guidance to users. The checking result indicating display 220*b* displays the checking result for approval/disapproval of the passing. The conveying mechanism (not shown) conveys magnetic the tickets received through the insert port 214*b* to the collector 207. Further, this checking processor 210*b* has no take-out port. In other words, the magnetic tickets received through the insert port 214*b* are all collected in the collector 207 in the apparatus.

The conveying mechanism (not shown) of the checking processor 210*a* is covered by a top cover 226*a*. This top cover 226*a* is provided to be able to open/close against the automatic ticket checking apparatus. On this top cover 226*a*, the insert port 214*a*, communicator 216*a*, guidance display 218*a*, checking result-indicating display 220*a* and take-out port 222*a* are provided. Similarly, the conveying mechanism (not shown) of the checking processor 210*b* is covered by a top cover 226*b*. This top cover 226*b* is provided to be able to open/close against the automatic ticket checking apparatus. On this top cover 226*b*, the inert port 214*b*, wireless communicator 216*b*, guidance display 218*b* and checking result-indicating display 220*b* are provided.

The top cover 226*a* opens to one passage side separated by the automatic ticket checking apparatus and the top cover 226*b* opens to the other passage side separated by this automatic ticket checking apparatus. Thus, even when one of the top covers opens and the one of the passages becomes unusable, the other passage will not becomes unusable.

Figure 9:
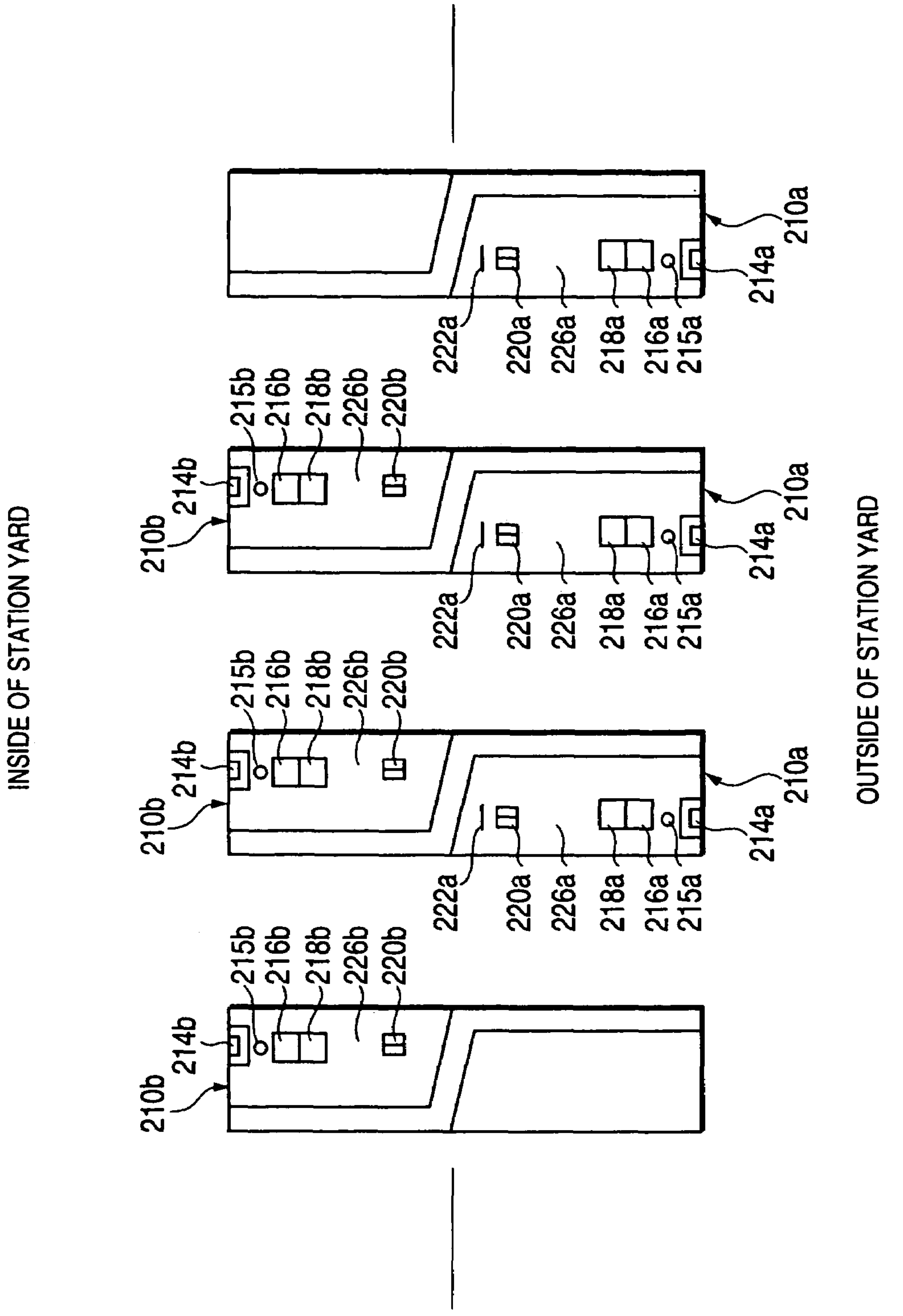
FIG. 9 is a plan view showing an example of installation of the automatic ticket checking apparatus shown in FIG. 8.

In succession, referring to FIG. 9, an example of the installation of the automatic ticket checking apparatus will be explained. As shown in FIG. 9, a plurality of automatic ticket checking apparatus is installed at the boarder between the outside and the inside of the station yard. At this time, a space between these automatic ticket checking apparatus becomes a common passage for the ticket checking. Further, for the automatic ticket checking apparatus, those equipped with only one of the checking processors 210*a* and 210*b* are installed.

When a user received the checking process with a magnetic ticket carried, the user enters into the passage from the outside of the station yard and inserts a magnetic ticket into the insert port 214*a*. The inserted magnetic ticket is conveyed by the conveying mechanism and on the way being conveyed, data recorded on the magnetic ticket is read by a reading/recording magnetic head and prescribed data is recorded on the magnetic ticket when required. The main controller (not shown) checks approval/disapproval for the passage based on data read from the magnetic ticket and data recorded on a fare memory. When the passing is approved, the magnetic ticket is punched and printed and ejected from the take-but port 222*a*. At this time, the guidance for taking out the ticket is displayed on the checking result indicating display 220*a* and the same voice guidance is output from the speaker 206. When the passing is disapproved, the magnetic ticket is ejected from the take-out port as it is and the door 204 is closed to check the passing (the entry into the station yard) of the user. At this time, the guidance that the ticket is improper and the guidance for pulling out the ticket are displayed on the checking result indicating display 220*a* and the same voice guidance is output from the speaker 206.

When a user receives the checking process with a wireless ticket carried, the user enters into the passage from the outside of the station yard and holds up a wireless ticket over the wireless communicator 216*a*. At this time, the data recorded on the wireless ticket is read and prescribed data is recorded on the wireless ticket when necessary. The main controller checks the approval/disapproval for the passing based on the data read from the wireless ticket and the data recorded on a fare memory. When the passing is approved, the guidance for approval of the passing is displayed on the checking result indicating display 220*a* and the same voice guide is output from the speaker 206. When the passing is disapproved, the door 204 is closed to check the passing (the entry into the station yard) of a user. At this time, the checking result indicating display 220*a* displays the guidance that the ticket is improper and the same voice guidance is output from the speaker 206.

When a user receives the checking process for collection with a magnetic ticket carried, the user enters into the passage from the inside of the station yard and inserts a magnetic ticket into the insert port 214*b*. The inserted magnetic ticket is conveyed by the conveying mechanism and on the way being conveyed, the data recorded on the magnetic ticket is read out by the reading/recording magnetic head. The main controller checks the approval/disapproval for the passing based on the data read out from the magnetic ticket and the data recorded on the fare memory. When the passing is approved, a magnetic ticket is collected in the collector 207. Thus, when the passing is approved in the checking process, magnetic tickets are always collected in the collector 207 without returning to users. As a result, it is not required to provide a take-out mechanism to eject magnetic tickets and the equipment configuration can be simplified. When the passing is disapproved, magnetic tickets are ejected (returned) from the insert port 214 or they are held in the holding mechanism for processing by a station staff. In this case, the door 204 is closed to check the passing of a user (the exit to the outside of the station is prohibited). At this time, the checking result indicating display 220*b* displays that the ticket is improper, the take-out of the ticket and the like, and also, the same voice guidance is output from the speaker 206.

When a user receives the checking process for collection with a magnetic ticket carried, the user enters into the passing from the inside of the station yard and holds up a wireless ticket over the wireless communicator 216*b*. At this time, through the wireless communication between the wireless ticket and the wireless communicator 216*b*, the data recorded on the wireless ticket is read out and when required, the prescribed data is recorded on the wireless ticket. The main controller checks the approval/disapproval of the passing of the user based on the data readout of the wireless ticket and the data recorded on the fare memory. When the passing is approved, the checking result indicating display 220*b* displays the guidance of the approval of the passing and also, the same voice guidance is output from the speaker 206. When the passing is disapproved, the door 204 is closed and the passing of the user is checked (the exit to the outside of the station yard is prohibited). At this time, the checking result indicating display 220*b* displays the guidance that the ticket is improper and also, the same voice guidance is output from the speaker 206.

Figure 10:
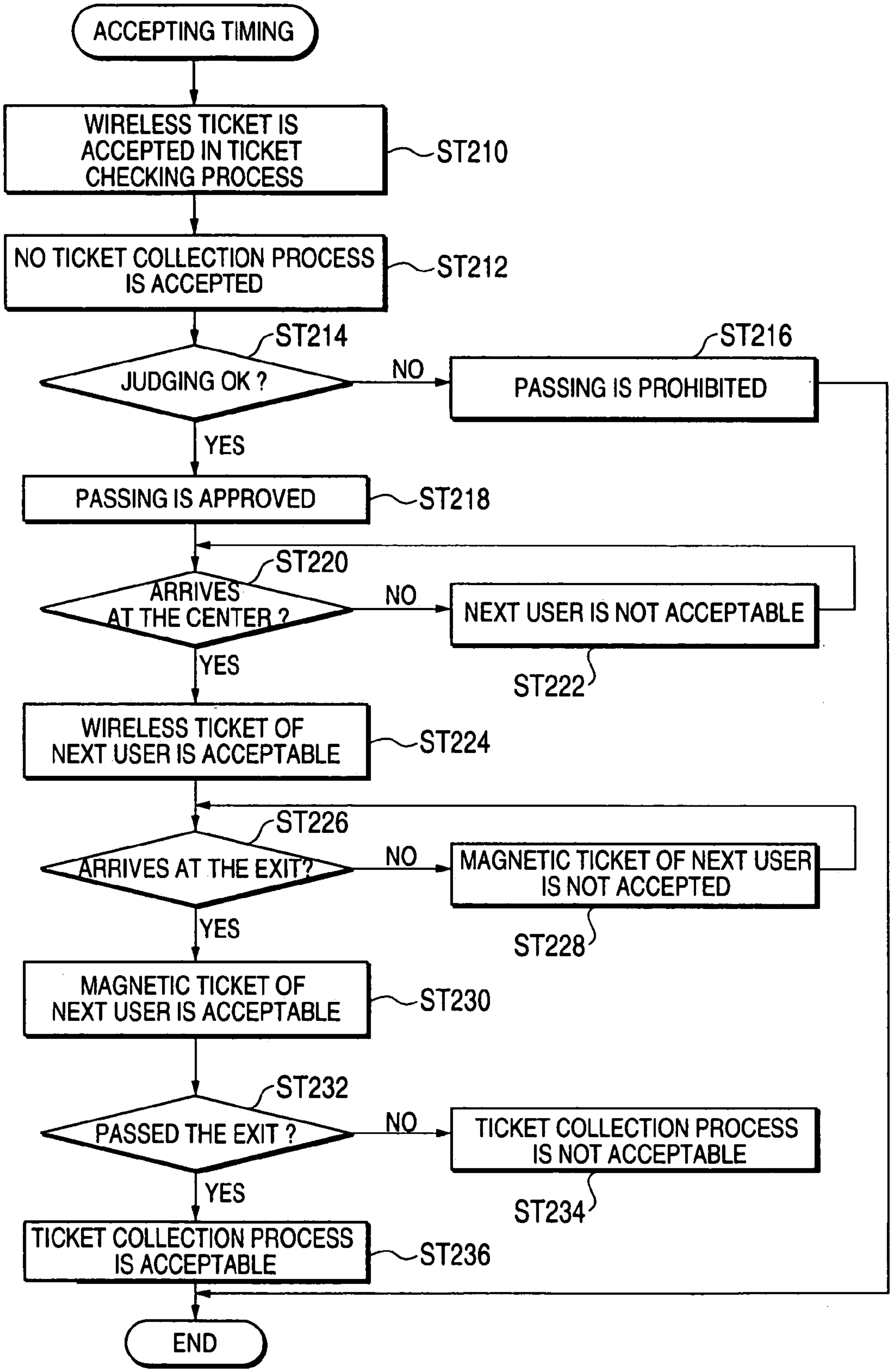
FIG. 10 is a flowchart showing the receiving timing of users of the automatic ticket checking apparatus shown in FIG. 8.

Then, referring to a flowchart shown in FIG. 10, the accepting timing of user by the automatic ticket checking apparatus will be explained. The checking processor 210*a* of the automatic ticket checking apparatus of the present invention is provided with a take-out port 222*a* at nearly the center of the checking passage. Therefore, there is such the possibility that a user of a wireless ticket who entered into the checking passage first may take out a magnetic ticket of a user who enters into the passage later. So, it is necessary to control a timing to accept next user as explained below.

Assuming two units of No. 1 and No. 2 automatic ticket checking apparatus installed adjoining each other, the timing to accept a user who passes the checking passage between these No. 1 and No. 2 units will be explained. In this connection, it is assumed that the checking processor 210*a* of No. 1 unit is used for checking a user who passes through this passage and the checking processor 210*b* of No. 2 unit is used for checking a user who passes this passage.

In the state where there is no user entered in the checking passage between No. 1 and No. 2 units; that is, when both of the checking processors 210*a* and 210*b* are in the user waiting state, a user carrying a wireless ticket (hereinafter this user is called a preceding user) enters into the passage after the checking process by No. 1 checking processor 210*a*. In other words, No. 1 checking processor 210*a* (ST210) accepts a wireless ticket. At this time, the acceptance by No. 2 checking processor 210*b* is prohibited (ST212) and for example, the guidance prohibiting the entrance is displayed on No. 2 passage display 212*b*.

In the checking process by the checking processor 210*a* of No. 1 unit, when the passing of a preceding user by a wireless ticket is not approved (ST214, NO), the door is closed and the user is prevented to pass the checking passage (ST216). When the user is approved to pass the checking passage with a wireless ticket (ST214, YES), the door is kept open and the user is approved to pass through the checking passage (ST218).

Thereafter, based on the output from the sensor 205, the passing state of the preceding user is recognized and based on the passing state of this preceding user, the acceptance timing of the next user is controlled. For example, until the preceding user reaches the center of No. 1 unit (ST220, NO), a next user is not accepted (ST222). That is, a magnetic ticket carried by the next user is not accepted and a wireless ticket is also not accepted. Accordingly, the insert port shutter is closed and the insert of a magnetic ticket into the insert port 214*a* is prohibited. At this time, the guidance for prohibiting the entry is displayed on the passage display 212*a* of No. 1 unit. When the arrival of a preceding user at the center of No. 1 unit is known (ST220, YES), the acceptance of a wireless ticket of the next user only is approved (ST224). At this time, the guidance of prohibiting the entry of a user carrying a magnetic ticket is displayed on the passage display 212*a* of No. 1 unit.

Until the preceding user reaches at the exit of No. 1 unit (ST226. NO), a magnetic ticket of the next user is not accepted (ST228). When the arrival of the preceding user at the exit of No. 1 unit is known (ST226, YES), the acceptance of a magnetic ticket of the next user is also approved (ST230). At this time the insert port shutter is opened and the insert of a magnetic ticket into the insert port 214*a* is approved.

Until the preceding user passes out the exit of No. 1 unit (ST232, NO), the acceptance of the checking process by the checking processor 210*b* of No. 2 unit is continuously prohibited (ST234). When the pass of the preceding user through the exit of No. 1 unit is known (ST232, YES), the acceptance of the checking process by-the checking processor 210 of No. 2 unit is approved (ST236) At this time, the guidance for prohibiting the entry displayed on the passage display 212*b* of No. 2 unit is cleared.

As described above, when the next user has a wireless ticket, the acceptance is approved earlier than a magnetic ticket. This is because when the next user has a wireless ticket, the preceding user will not take away the next user's wireless ticket erroneously. Therefore, the preceding user's wireless ticket is wireless communicated, the passing is checked, required data is transmitted to the wireless ticket and at the timing when the required data is transmitted to the wireless ticket and recording is completed, the acceptance of the next user's wireless ticket is approved. When the next user has a magnetic ticket, the acceptance is approved after the arrival of the preceding user (having a wireless ticket) at the exit after passing the center of the automatic ticket checking apparatus is made clear.

When a user who has a wireless ticket only is processed according to the above-mentioned acceptance timing, the acceptance of a next user becomes faster and using efficiency of the automatic ticket checking apparatus is improved. That is, when the processing mode of the automatic ticket checking apparatus is changed as shown below, using efficiency of the automatic ticket checking apparatus can be promoted.

The automatic ticket checking apparatus of the present invention is provided with a mode change switch likewise the first embodiment. Similarly, the monitor is also provided with a mode change switch. The mode change switch provided to the monitor is capable of changing a mode for every unit. This mode change switch changes the magnetic ticket only mode, the wireless ticket only mode and the combined ticket mode.

When the mode is changed to the magnetic only mode by the mode change switch, the object of the automatic ticket checking apparatus for the checking process becomes magnetic ticket only. At this time, the passage displays 212*a* and 212*b* display the guidance that magnetic tickets only will be processed. In this case, even when a wireless ticket is effective, its user is not approved to pass through the passage. When the ode is changed to the wireless ticket mode only by the mode change switch, the object of the automatic ticket checking apparatus for the checking process becomes wireless tickets only. At this time, the passage displays 212*a* and 212*b* display the guidance that wireless tickets only are the objects for process. Further, the insert port shutters provided at the insert ports 214*a* and 214*b* are closed so as not to be able to insert magnetic tickets therein. When the mode is changed to the combined ticket mode by the mode change switch, the objects of the automatic ticket checking apparatus for the checking process becomes both magnetic tickets and wireless tickets. At this time, the passage displays 212*a* and 212*b* display the guidance that both magnetic tickets and wireless tickets are objects of the process.

For example, assume a station wherein a plurality of automatic ticket checking apparatus are installed and a plurality of checking passages are provided. In such a station, the majority of automatic ticket checking apparatus is operated in the wireless ticket only mode in the morning and evening rush hours. The remaining automatic ticket checking apparatus are operated in the magnetic ticket only mode or the combined ticket mode. In the morning and even rush hours, most users are those who are using commutation tickets. In the operation of the automatic ticket checking apparatus, wireless tickets are allocated to all commutation tickets. That is, in the morning and evening rush hours, the majority of automatic ticket checking apparatus is operated in the wireless ticket only mode so that processing efficiency per unit can be promoted and as a result, the confusion of the checking process can be relieved. This is one example and by changing the operating mode of the automatic ticket checking apparatus according to a time zone or a weekday, etc., efficiency of the checking process can be promoted.

As explained above, the automatic ticket checking apparatus of the present invention is capable of processing both magnetic tickets and wireless tickets and for this purpose, the magnetic ticket processing mechanism and the wireless ticket processing mechanism are provided. If either one of them fails to operate; that is, the process by either magnetic tickets or wireless tickets is disabled, the automatic ticket checking apparatus can be operated by changing the processing mode as described above. The mode may be changed by a maintenance worker or may be changed automatically by the apparatus itself by checking the state of the trouble. Thus, even when magnetic tickets only cannot be processed, the checking process by wireless tickets is possible. On the contrary, even when wireless tickets only cannot be processed, the checking process by magnetic tickets becomes possible.

Figure 11:
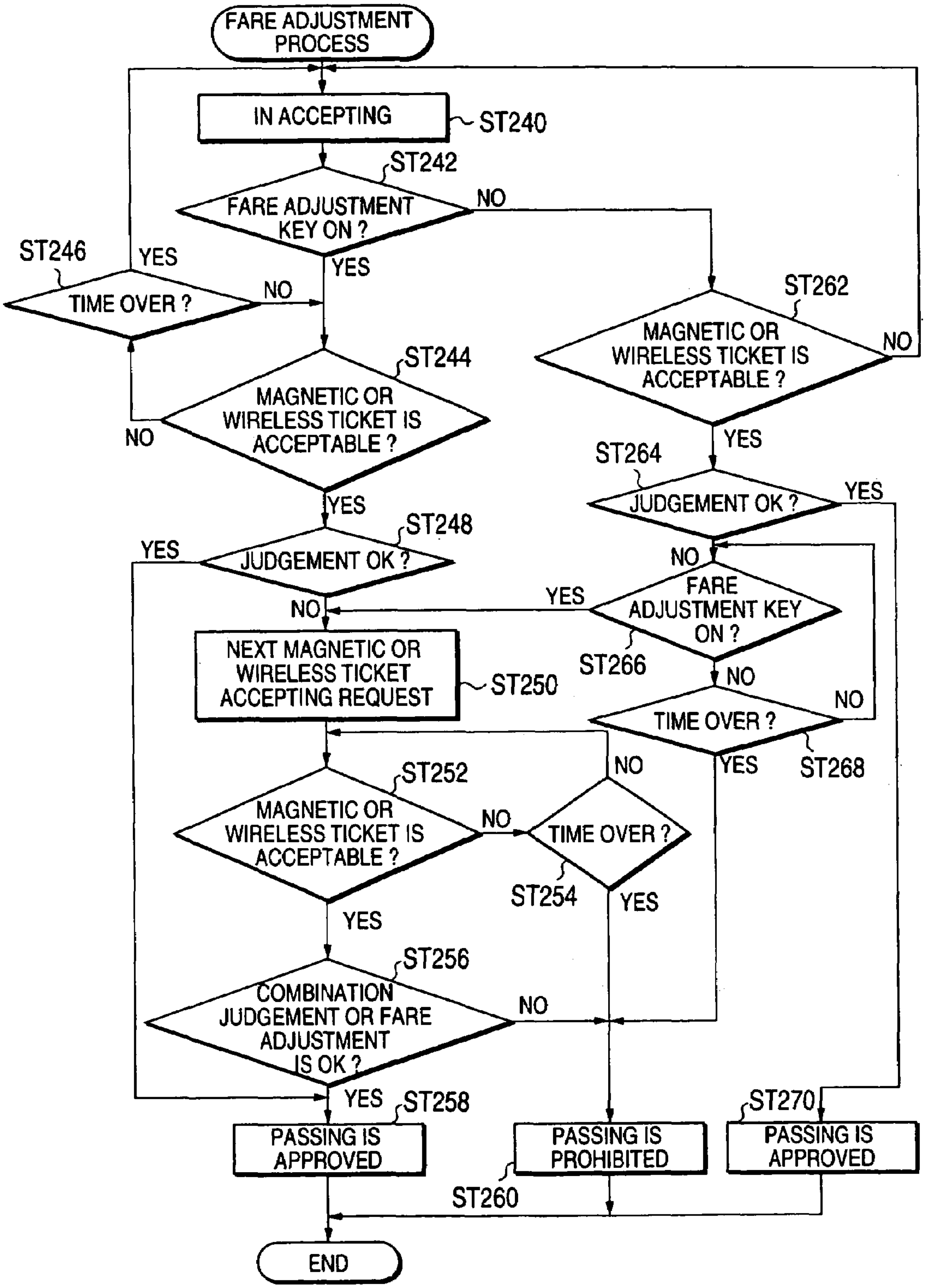
FIG. 11 is a flowchart showing the exact calculation process by the automatic ticket checking apparatus shown in FIG. 8.

In succession, referring to a flowchart shown in FIG. 11, the fare adjustment by the automatic ticket checking apparatus of the present invention will be explained. The automatic ticket checking apparatus of the present invention is provided with the fare adjustment keys 215*a* and 215*b* and the fare adjustment process is enabled when this fare adjustment key 215*a* is depressed. The fare adjustment key 215*a* may be depressed at the timing before or after processing a first ticket. Further, making the guidance displays 218*a* and 218*b* as the touch panel, the fare adjustment key may be displayed on these guidance displays 218*a* and. 218*b*. Further, the automatic ticket checking apparatus may be made in such structure that the requirement for the fare adjustment is automatically checked by the equipment and demands the fare adjustment without providing the fare adjustment key on the automatic ticket checking apparatus.

First, a case wherein the fare adjustment key is depressed before a first ticket is processed will be explained. It is assumed that the fare adjustment key 215*a* or 215*b* is depressed (ST242, YES) when the automatic ticket checking apparatus is accepting both of a magnetic ticket and a wireless ticket (ST240). In other words, when a user knows that the checking process is not approved by a piece of magnetic or wireless ticket only which is carried by the user, the fare adjustment key 215*a* or 215*b* may be depressed before the ticket is accepted. Needless to say, unless a user has another magnetic or wireless ticket for the fare adjustment, the subsequent fare adjustment cannot be made.

When a magnetic ticket or a wireless ticket is not accepted within a prescribed period (ST244, NO) after the fare adjustment key 215*a* or 215*b* is depressed (ST242, YES), the time is over (ST246, YES) and the process returns to the initial step. When a magnetic ticket or a wireless ticket is accepted in the prescribed period (ST244, YES), the checking process is executed based on the accepted ticket (ST258). At this time, such a guidance as "NO FARE ADJUSTMENT IS REQUIRED", "PLEASE PASS THE PASSAGE", etc. is displayed on the checking result indicating display 220*a* or 220*b*. When the checking result is NG (ST248, NO), the insert of a next magnetic ticket or a wireless ticket for the fare adjustment is demanded (ST250). At this time, such a guidance as "INSERT A MAGNETIC TICKET FOR THE FARE ADJUSTMENT INTO THE INSERT PORT OR HOLD UP A WIRELESS TICKET OVER THE COMMUNICATOR", etc. is displayed on the guidance display 218*a* or 218*b*. Further, the first ticket is a magnetic ticket, this first magnetic ticket is held in the holding mechanism and waits for the combined ticket checking and the fare adjustment process.

If a magnetic ticket or a wireless ticket is not accepted (ST252, NO) although a next magnetic ticket or a wireless ticket (for the fare adjustment) is demanded (ST250), the time is over (ST254, YES), the door is closed and the passing is prohibited (ST260). When the first ticket is a magnetic ticket, the ticket is returned to a user. At this time, such the guidance as "PLEASE DO ONCE MORE FROM THE BEGINNING" is displayed on the guidance display 218*a* or 218*b*. When a magnetic ticket or a wireless ticket is accepted within the prescribed period (ST252, YES), the combined ticket checking or the fare adjustment is carried out (ST256). When the checking result of combined first and second tickets is OK (ST256, YES), the passing is approved (ST258). Further, when either one of the first and second tickets is a ticket of which fare is adjustable (SF card, etc. that has a sufficient amount for the fare adjusting), the passing is approved after executing the fare adjustment (ST258). Further, in the above-mentioned combined checking or the fare adjustment, prescribed data is recorded on a ticket when necessary. When the combined checking result is NG and the fare adjustment cannot be made (ST256, NO), the door is closed and the passing is prohibited (ST260).

Next, a case wherein the fare adjustment key is depressed after processing the first ticket will be explained. When the automatic ticket checking apparatus is accepting both of a magnetic ticket and a wireless ticket (ST240), the magnet ticket or the wireless ticket is accepted (ST262, YES) without the fare adjustment key 215*a* or 215*b* depressed, the passing checking process is executed based on the accepted one sheet of ticket (ST264). When the checking result is OX (ST264, YES), the passing is approved (ST270). When the checking result is NG (ST264, NO), the door is closed, the passing is prohibited and such a guidance as "DEPRESS THE FARE ADJUSTMENT KEY IF THE FARE ADJUSTMENT PROCESS IS DESIRED", etc. is displayed on the guidance display 218*a* or 218*b*. When the fare adjustment key 215*a* or 215*b* is not depressed within the prescribed period of time (ST266, NO), the time is over (ST268, YES), the passing is prohibited and the process is terminated (ST260). In this case, when the first sheet of ticket is a magnetic ticket, this magnetic ticket is returned to a user. When the fare adjustment key 215*a* or 215*b* is depressed within the prescribed period of time (ST266, YES), a next magnetic ticket or wireless ticket for the fare adjustment is demanded (ST250). At this time, such a guidance as "INSERT A MAGNETIC TICKET FOR THE FARE ADJUSTMENT INTO THE INSERT PORT OR HOLD UP A WIRELESS TICKET OVER THE COMMUNICATOR", etc. is displayed on the guidance display 218*a* c 218*b*. Further, when the first sheet of ticket is a magnetic ticket, this first magnetic ticket is held in the holding mechanism and waits the combined checking and the fare adjustment.

When a magnetic ticket or a wireless ticket is not accepted within the prescribed period of time (ST252, NO) although a next magnetic ticket or a wireless ticket is demanded for the fare adjustment, the time is over (ST254, YES), the door is closed and the passing is prohibited (ST260). When the first sheet of ticket is a magnetic ticket, this ticket is returned to a user. As this time, such a guidance as "DO ONCE MORE FROM THE BEGINNING", etc. is displayed on the guidance display 218*a* or 218*b*. When a magnetic ticket or a wireless ticket is accepted within a prescribed time (ST252, YES), the combined ticket checking or the fare adjustment is executed (ST256). When the combined ticket checking results of the first and second tickets is OK (ST256, YES), the passing is approved. Further, when either one of the first ticket or the second ticket is a fare adjustable ticket (SF card, etc. having a sufficient amount for the fare adjustment), the passing is approved after executing the fare adjustment (ST258). Further, in the above-mentioned combined ticket checking or the fare adjustment process, prescribed data is recorded on a ticket as required. When the combined ticket checking result is NG and the fare adjustment also cannot be made (ST256, NO), the door is closed and the passing is prohibited (ST260).

Here, the action and effect of the automatic ticket checking apparatus of the present invention described above will be summarized.

(1) The size of magnetic ticket adaptable to the automatic ticket checking apparatus of this invention is restricted to one size. For example, its size is restricted to the Edomondson size, which is smaller than a commutation ticket size. Then, wireless tickets adaptable to the automatic ticket checking apparatus should cover all kinds of tickets other than magnetic tickets restricted to one size. Thus, it is not required to provide an alignment unit to adapt magnetic tickets in plural sizes in the automatic ticket checking apparatus. Furthermore, it becomes possible to downsize the holding unit in the automatic ticket checking apparatus (as it is no longer required to adapt the holding unit to a commutation ticket size) and the interval between the magnetic heads also can be made short (similarly, it becomes not required to adapt to he commutation ticket size). As a result, the automatic ticket checking apparatus can be made in a small size and a cost can be reduced. In particular, the conveying direction can be shortened.

(2) Since the ticket conveying direction can be made short as described above, the checking processors 210*a* and 210*b* can be installed in series along the checking passing direction without extending the checking passage. That is, it becomes unnecessary to install them in parallel with each other along the checking passage as before.

(3) As described above, the size of magnetic ticket is restricted and the functions also are restricted. For example, tickets to be processed are restricted to one-day short distance tickets effective for one-day only. Thus, it becomes unnecessary for the checking processor 210*b* to return the inserted magnetic tickets and therefore, it is not required to provide a ticket return port. As a result, the equipment configuration can be simplified and the cost down can be achieved.

(4) In the automatic ticket checking apparatus of the present invention, it is possible to simplify the apparatus and reduce cost by restricting a reading magnetic head to be provided in one direction only.

(5) The automatic ticket checking apparatus of the present invention can be operated by changing the operating mode into the magnetic ticket only mode, the wireless ticket only mode or the combined ticket mode by the mode change switch. So, working efficiency can be promoted by selecting the optimum checking process mode according to the state.

For example, when assuming a station with a plurality of automatic ticket checking apparatus installed and a plurality of checking passages provided, in such the station, the majority of the automatic ticket checking apparatus is operated in the wireless ticket only mode in the morning and evening rush hours. The remaining automatic ticket checking apparatus are operated in the magnetic ticket only mode or the combined ticket mode. In the morning and evening rush hours, the majority of users is those who are using commutation tickets. When operating the automatic ticket checking apparatus, wireless tickets are allocated to commutation tickets. In other words, during the morning and evening rush hours, many users use commutation tickets and therefore, ticket processing efficiency per apparatus can be promoted by operating the majority of the automatic ticket checking apparatus in the wireless ticket only mode. As a result, the confusion of the ticket processing can be relieved. Further, when the checking process of either magnetic tickets or wireless tickets is disabled, the automatic ticket checking apparatus can be operated by selecting the optimum processing mode as described above.

Further, as the automatic-ticket checking apparatus is provided with a display to indicate an applied operating mode, users are able to use without being confused.

(6) The automatic ticket checking apparatus of the present invention is capable of executing the fare adjustment adapting to any combination of magnetic ticket and wireless ticket.

According to the present invention, the automatic ticket checking apparatus shown below can be provided.

(1) An automatic ticket checking apparatus suited to downsizing.

(2) An automatic ticket checking apparatus capable of operating at high efficiency by adapting to magnetic tickets and wireless tickets and according to the operating state.

(3) An automatic ticket checking apparatus capable of executing the fare adjustment adapting to magnetic tickets and wireless tickets.

Next the automatic ticket checking apparatus as a third embodiment of the present invention.

Figure 12:
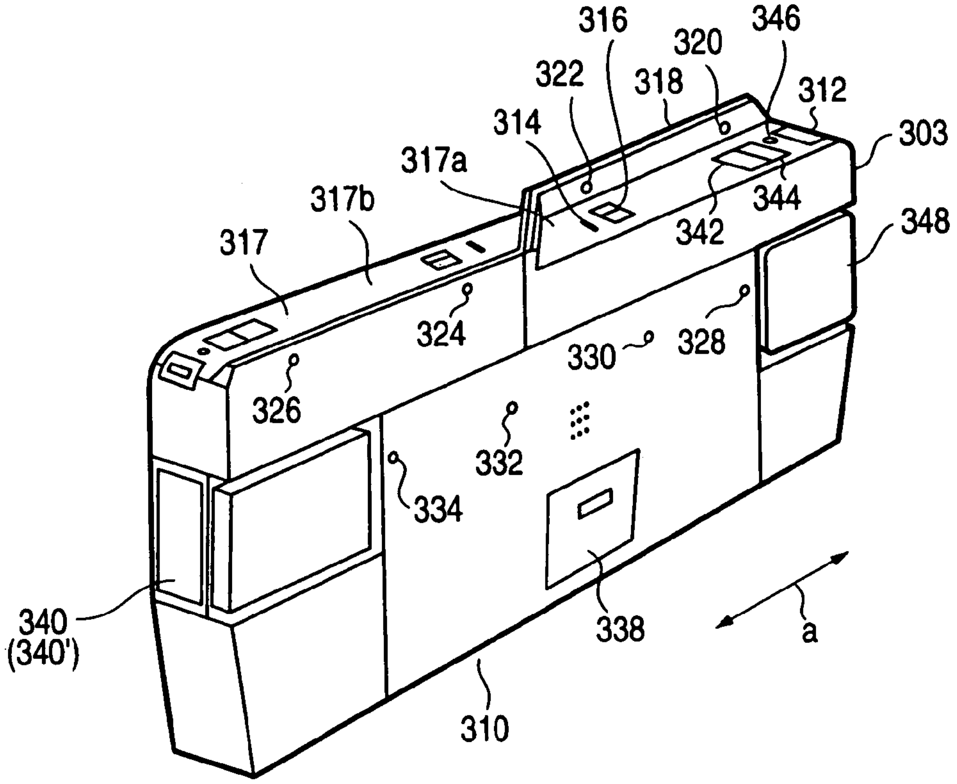
FIG. 12 is a perspective view showing the outline of the external appearance of the automatic ticket checking device as a third embodiment of the present invention.

FIG. 12 is a perspective view showing the outline of the external appearance of the automatic ticket checking apparatus 310 (the housing of the wireless communicator) as a third embodiment of the present invention.

The automatic ticket checking apparatus 310 is equipped with an insert port 312 into which a magnetic ticket is inserted and a take-out port 314 from which the ticket inserted into the insert port 312 is returned after conveyed by a conveying mechanism described later. Between this take-out port 314 and the insert port 312 and near the take-out port 314, a checking result indicating display 316 to display the guidance on the approval/disapproval of the passing to users is provided. On the top surface (a top cover 317*a* and 317*b*) of the automatic ticket checking apparatus, a partition 318 is provided. As shown in FIG. 12, this partition 318 is formed in parallel with the passing direction of the passage a near the insert port 312 at both ends of the apparatus but is not in parallel with the direction of the passage (the oblique direction spreading to the passage side) at the center of the apparatus. Further, this partition 318 is provided with sensors 320, 322, 324 and 326. On the side of the automatic ticket checking apparatus, sensors 328, 330, 332 and 334 are provided, and the passing state of a user can be checked by sensing the upper and lower sensors 320 and 328, 322 and 330, 324 and 332, and 326 and 334. Further, a voice guidance speaker 336 to provide a voice guidance to users and a collector box 338 to accumulate the collected tickets out of the magnetic ticket inserted into the insert port 312 and is removable from the apparatus are provided on the side of the automatic ticket checking apparatus 310 and a passage display 340 is provided on the front surface to display whether the apparatus is usable.

Further, the automatic ticket checking apparatus 310 is provided with a wireless antenna (a wireless communication equipment) 342 which is a wireless communicator to wireless communicate (transmission, reception) with wireless tickets, and a guidance display 344 (may be replaced with a touch panel for receiving input when required) to present a wireless ticket (a wireless equipment) or display the guidance relative to the insert of magnetic tickets. The wireless antenna 342 is provided behind the insert port in the passing direction of a user. The wireless antenna 342 and the guidance display 344 are provided at the passage side of users who use the wireless antenna 342, the guidance display 344 and the insert port 312 of the automatic ticket checking apparatus 310. That is, in FIG. 12, they are provided close to the right side passage not to the left side passage of the automatic ticket checking apparatus 310. Further, there is a selection button to select and input the use of the fare adjustment, and when this butt on is operated, the passing of the automatic ticket checking apparatus by a user is checked by combining the using information of a wireless ticket and a magnetic ticket.

Further, what is described in the above is the explanation of about half of the right side in FIG. 12 and the left half is not explained because the left half portion has the similar construction and functions.

The partition 318 is provided on the top cover 317 to prevent a passenger using the adjacent passage to erroneously present a wireless ticket and to separate the right side half portion from the left side half portion and is in the shape projecting from the top cover 317.

Further, the automatic ticket checking apparatus is provided with a door 348. When a ticket is invalid, this door 348 is closed to stop a user.

Figure 13:
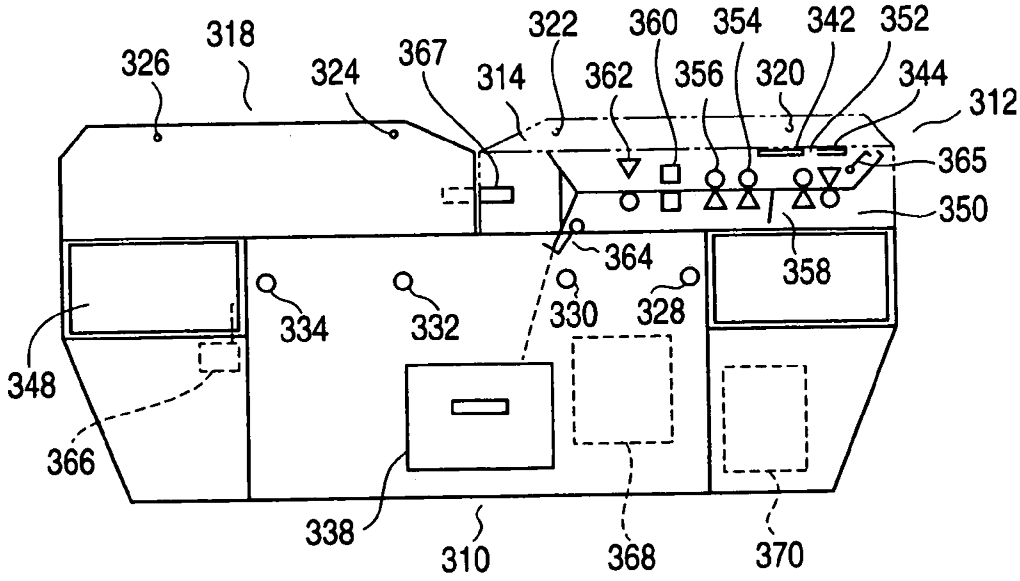
FIG. 13 is a outline diagram showing a part of the internal construction together with the side of the automatic ticket checking device sown in FIG. 12.

FIG. 13 is a diagram showing the side of the automatic ticket checking apparatus 310 and the outline of the cross-section of its partial internal structure.

Here, tickets that are processed by the automatic ticket checking apparatus 310 are magnetic tickets in one size only; definitely, ordinary ticket (a short-distance ticket, coupon tickets so-called Edomondson tickets) and wireless tickets as other types of tickets than ordinary tickets (for example, current commutation ticket, pre-paid tickets (Stored Fare Card), coupon ticket cards, long-distance tickets, etc.). That is, tickets that are processed by this automatic ticket checking apparatus are two kinds ordinary tickets as magnetic tickets and wireless tickets. Further, an ID code for identifying a ticket, a station where one gets in the train, a station where one gets off the train (or a fare from a station where gets in the train), date and time processed by an automatic ticket checking apparatus, a usable section, period and other using data for commutation tickets are constructed on each ticket. Further, as described above, by restricting magnetic tickets to one size, the magnetic ticket conveying mechanism can be simplified.

When inserted into the insert port 312 by a user, a magnetic ticket is conveyed by a conveying mechanism 350. The conveying mechanism 350 is equipped with a magnetic reader 352 that is composed of a magnetic head and a platen roller and a magnetic writer 354, a write confirmation mechanism, a reversing mechanism 358 that aligns the front and back of a magnetic ticket based on the reading result of the magnetic reader 352 and further, a printer mechanism 360 that prints date, etc. on magnetic tickets a punching mechanism 362 that punches magnetic tickets, and a stopper 364 that holds a magnetic ticket temporarily and conveys a magnetic ticket through various mechanisms on the conveying belt and to the take-out port 314. The magnetic tickets held in the stopper temporarily is accumulated in a collection box 338 when a user passed the sensors 322 and 330 near the take-out port 314.

As described above, the inserted magnetic ticket is conveyed by the conveying mechanism 350. When a magnetic ticket cannot be conveyed by the conveying mechanism 350, the insert of magnetic tickets is prohibited by rotating an insert port shutter 365 provided to the insert port 312 in the clockwise direction centering around its rotary shaft.

When the magnetic ticket read by the magnetic reader 352 or the wireless ticket read by the wireless antenna 342 is judged to be valid based on the using data of the read ticket, the door 348 is opened by a door opening/closing driver 366. When the ticket is judged to be invalid, the door 348 is kept closed by the door opening/closing driver 366.

Figure 15:
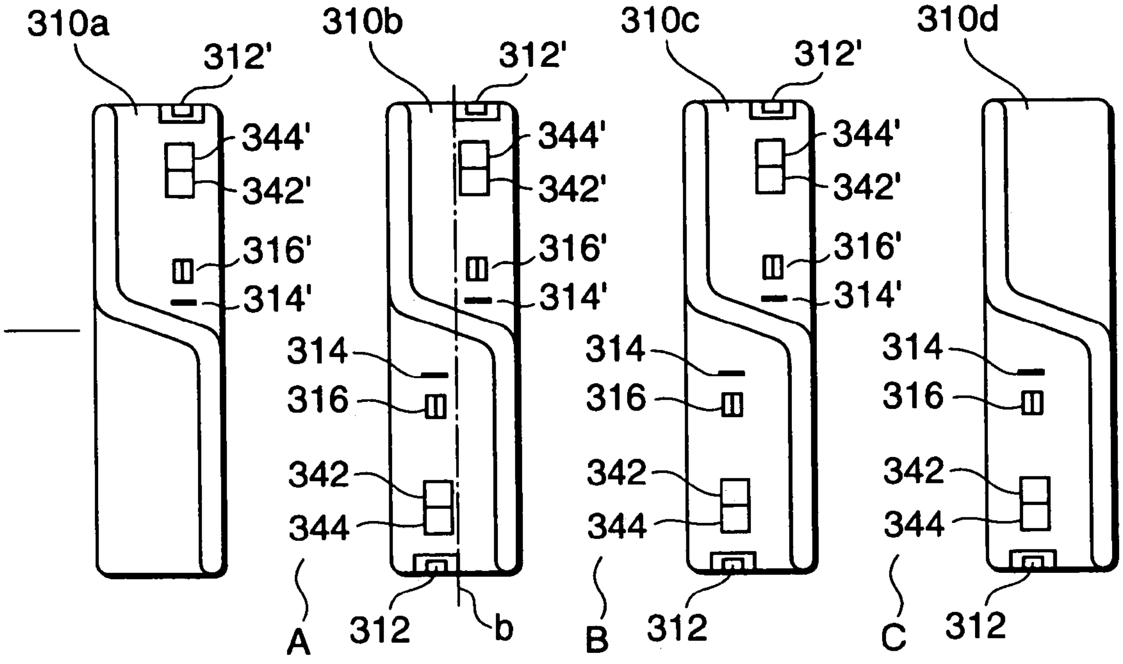
FIG. 15 is a plan view showing an installed example of the automatic ticket checking apparatus.

Further, as explained in FIG. 12, the insert port 312 is provided this side not in the inner part of the automatic ticket checking apparatus 310 and the conveying mechanism 350 that conveys the magnetic ticket inserted into the insert port 312 is also provided this side not in the inner part of the automatic ticket checking apparatus in FIG. 13 (See the layout shown in FIG. 15).

Further, a control panel 367 is provided and it is possible to display the read result of a magnetic/wireless ticket, various set-up states, etc. by operating this panel.

In addition, the automatic ticket checking apparatus 310 has various kinds of programs and memories, a control unit 368 including a main controller that receives the outputs from various component units and executes various kinds of controls of component units based on the received outputs and a power source 370 to supply electric power to the control unit 368 and other component units.

Figure 14:
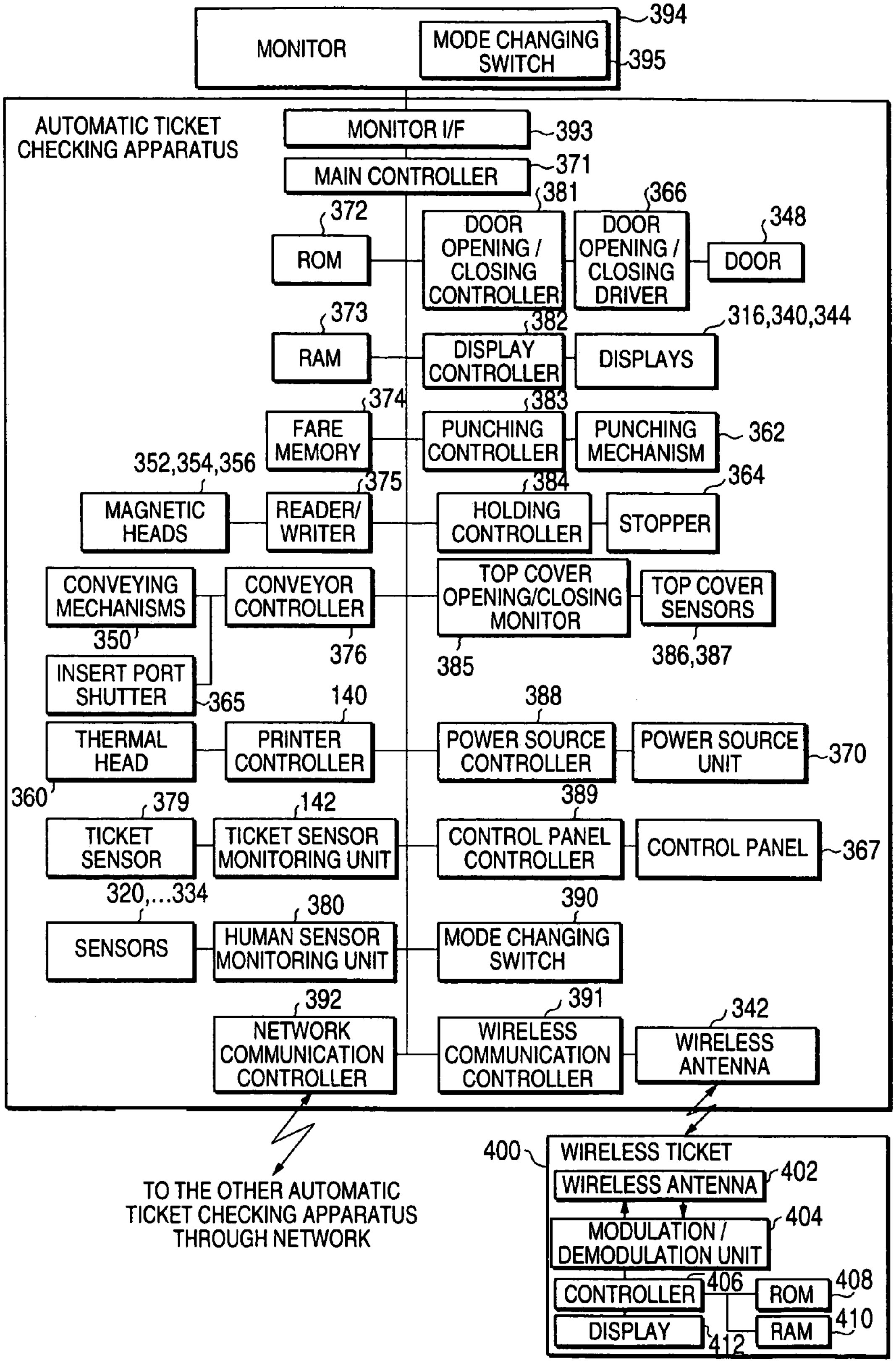
FIG. 14 is a block diagram showing the outline of the structure of the automatic ticket checking apparatus shown in FIG. 12.

FIG. 14 is a block diagram showing the brief construction of the automatic ticket checking apparatus and wireless ticket of the present invention. As shown in FIG. 14, the automatic ticket checking apparatus of this invention is provided with a control unit 368, a main controller 371, a ROM 372 for storing various kinds of program of the main controller 371, a RAM 373 for storing various kinds of data temporarily, and a fare memory 374 for storing fares between stations and is used for checking the proper use of tickets. Further, a reader/writer 375 controls the reading/writing magnetic heads 352, 354 and a write confirmation mechanism 356, reads out data magnetically recorded on magnetic tickets and write prescribed data magnetically on magnetic tickets. The conveyor controller 376 controls the conveyance of magnetic tickets by the conveying mechanism 350. Further, this conveyor controller 376 controls an insert port shutter 365 provided at the insert port 312 and prohibits to insert magnetic tickets. The printer controller 377 prints and records prescribed data including a date of entrance, an entered station, etc. on magnetic tickets by controlling the thermal head (the printer mechanism) 360.

A ticket sensor monitoring unit 378 is provided along the conveying mechanism 350, checks ticket sensing signals from a plurality of ticket sensors 379 that sense the presence of a ticket and the passing state, and monitors the conveying state of a magnetic ticket by the conveying mechanism 350. A human sensor monitoring unit 380 checks human sensing signals from the human sensors 320–334 and monitors the state of passing and presence of user who is passing along the automatic ticket checking apparatus. A door mechanism controller 381 controls the opening/closing of the door 348 by a door opening/closing driver 366. A display controller 382 controls the display of a checking result indicating display 316, a passage display 340, a guidance display 344, etc. A punching controller 383 controls the timing of punching process by a punching mechanism 362 provided at a prescribed position along the conveying mechanism 350. A collector controller 384 control the collection of magnetic tickets by a stopper 364 provided at the prescribed position along the conveying mechanism 350. A top cover opening/closing monitor unit 385 checks a sensor signal from a top cover sensor 386 that senses the opening/closing state of the top cover 317*a* and a sensor signal from a top cover sensor 387 that senses the opening/closing state of a top cover 317*b*, and monitors the opening/closing state of he top covers 317*a* and 317*b*. A power source controller 388 controls the power supply, etc. of a power source 370.

A control panel controller 389 controls the automatic ticket checking apparatus based on settings, etc. that are input from the control panel 367. Further, this control panel controller 389 also controls the change of a maintenance object by the control panel 367. For example, when the top cover 317*a* only at the right side half shown in FIG. 12 is in the open stated (the opening/closing state of the top cover 317 is monitored by a top cover opening/closing monitor unit 385), the control panel controller 389 changes the maintenance object by the control panel 367 to the checking processor at the right side in FIG. 12. On the contrary, when the top cover 317*b* only at the left side half in FIG. 12 is in the open state, the control panel controller 389 changes the maintenance object by the control panel 367 to the checking processor at the left side in FIG. 12. Further, when both the top covers 317*a* and 317*b* are in the open state, the control panel controller 389 changes the maintenance object by the control panel 367 to the both checking processors.

A mode change switch 390 changes the modes of the automatic ticket checking apparatus. The modes available are the magnetic ticket only mode, the wireless ticket only mode and the magnet/wireless tickets combined mode. When a mode is changed to the magnetic ticket only mode by the mode change switch 390, the object for the checking process by the automatic ticket checking apparatus becomes magnetic tickets only. At this time, the passage display 340 displays the guidance indicating that the processing object is magnetic ticket only. In this case, even when a valid wireless ticket, a user will not be approved to pass the passage. When the magnetic ticket only mode is changed to the wireless ticket only mode by the mode change switch 390, the object for the checking process by the automatic ticket checking apparatus becomes wireless tickets only. At this time, the passage display 340 displays the guidance that the object for the process is wireless ticket only. Further, an insert port shutter 365 provided to the insert port 312 is closed by the control of a conveyor controller 376 so that a magnetic ticker cannot be inserted into the insert port 312. When the mode is changed to the magnetic/wireless ticket combined mode by the mode change switch 390, the object for checking process by the automatic ticket checking apparatus becomes both of magnetic tickets and wireless tickets. At this time, the passage display 340 displays the guidance that the objects for processing are both of magnetic tickets and wireless tickets;

A wireless communication controller 391 controls the transmission/receiving power, etc. of the wireless antenna 342, demodulates the data received through the wireless antenna 342, transfers the demodulated data to a RAM 373 and stores therein under the control of a main controller 371. Further, it modulates data stored in the RAM 373 and transmits it through the wireless antenna 342. A network communication controller 392 controls the communication with an external network and transmits data of own automatic ticket checking apparatus to other automatic ticket checking apparatus. A monitor interface 393 functions as an interface between an externally installed monitor 394 and the automatic ticket checking apparatus. Further, the monitor 394 is also provided with a mode change switch 395 that is similar to the mode change switch 390 described above. This mode changing switch 395 provided to the monitor 394 is also capable of changing a mode for every automatic ticket checking apparatus.

The data transmitted from the wireless antenna 342 of the automatic ticket checking apparatus 310 is received by a wireless antenna 402 of a wireless ticket 400, decoded by a modulation/demodulation unit 404 and processed by a controller 406. Further, this wireless ticket 400 contains a ROM (memory) 408 recorded with various kinds of programs for operating a controller, information for using a station system (ID code as an identifying information peculiar to the ticket, information of a usable section and period when equivalent to a current commutation ticket, a RAM (memory) 410 that stores data when a program was executed and data received through the wireless antenna temporarily, a using station name a balance when equivalent to a current monetary card in the non-volatile state, and a display 412 that displays data contained in the ROM 408 or RAM 410 by the operation of the controller 406.

Further, the structure of a magnetic ticket is the same as an ordinary ticket that is currently in use and therefore, the explanation thereof will be omitted.

An example of the installation of the above-mentioned automatic ticket checking apparatus will be explained referring to FIG. 15. As shown in FIG. 15, a plurality of automatic ticket checking apparatus 310*a*, 310*b*, 310*c* and 310*d* are installed at the boundary between the outside and the inside of the station yard. At this time, spaces between respective automatic ticket checking apparatus become common passages for the checking process A, B and C. Further, on the automatic ticket checking apparatus at both ends, either one of the ticket checking processor or the ticket collection processor is provided.

For respective automatic ticket checking apparatus 310, such structural elements as the insert port 312 (and the conveying mechanism 350), the take-out port 314, the checking result indicating display 316, the wireless antenna 342, and the guidance display 344. These structural elements of respective apparatus have similar functions and in the following explanation, the ticket collection side elements are expressed as the insert port 316' (and the conveying mechanism 350'), the take-out port 314', the checking result indicating display 316', the wireless antenna 342', and the guidance display 344'. As seen on the automatic ticket checking apparatus 310*b*, these structural elements (operated by user or provide a guidance to user) are provided at the passage side which is far from the center line of the ticket checking apparatus and passengers using these equipment pass and at the positions where they are hardly operated from the adjacent passage (for example, they are so arranged that the wireless communication area of wireless tickets becomes far).

When a user enters into the station yard with a magnetic ticket using the automatic ticket checking apparatus 310*b*, the user enters from the outside of the station yard along the passage A and inserts a magnetic ticket into the insert port 312. This inserted magnetic ticket is conveyed by the conveying mechanism 350 and the using information recorded on the magnetic ticket is read by the magnetic head 352 for reading. The main controller 371 checks the approval/disapproval of passing by comparing the using information including a using section (a usable fare) and a period that are read from a magnetic ticket with the data recorded in a fare memory 374. When the using conditions are satisfied, the passing is judged to be approved, data including an entered station name, applicable apparatus number and using time are recorded and confirmed on a magnetic ticket when required by a recording and reading magnetic head 354 and 356. Further, when required, the printing by a printing mechanism 360 and the punching process by a punching mechanism 362 are applied to a magnetic ticket and the ticket is ejected from the take-out port 314. At this time, the checking result indicating display 316 lights in blue to show the approval of passing. When the using conditions are not satisfied, the passing is judged to be not approval and the magnetic ticket is returned as it is from the take-out port 314 and the door is closed to check a user to pass (prohibit a user to enter into the station yard). At this time, the checking result indicating display 316 light in red to show the prohibition of the passing.

To receive the checking process with a wireless ticket using the automatic ticket checking apparatus 310*b*, a user enters from the outside of the station yard along the passage A and holds a wireless ticket up over the wireless antenna 342. At this time, the using information data including a using section and period recorded on a wireless ticket are read through the wireless communication between the wireless ticket and the wireless antenna 342. The main controller 371 checks the approval/disapproval of the passing by comparing the using data read from the wireless ticket with the data recorded on the fare memory 374. When the using conditions are satisfied, the passing is judged to be approved and the checking result indicating display 316 lights in blue. At this time, when required, the data including an entered station name, applicable apparatus number and using time are recorded on the wireless ticket. When the using conditions are not satisfied, the passing is judged to be not approval and the door 348 is closed to check a user to pass (prohibit a user to enter into the station yard). At this time, the checking result indicating display 316 lights in red.

To receive the checking process with a magnetic ticket using the automatic ticket checking apparatus 310*b*, a user enters from the inside of the station yard along the passage B and inserts a magnetic ticket into an insert port 312'. The using data are read from the inserted magnetic ticket likewise the ticket checking process and the read data are compared with the data recorded in a fare memory 374' and the approval/disapproval of the passing is checked by a main controller 371'. When the passing is approved, the magnetic ticket is collected and accumulated in a collection box 338'. At this time, a checking result indicating display 316' lights in blue. When the passing is not approved, the magnetic ticket is ejected as it is from a take-out port 314' and a door 348' is closed and a user is checked to pass (prohibits to exit to the outside of the station yard). At this time, the checking result indicating display 316' lights in red.

To receive the ticket collection process with a wireless ticket using the automatic ticket checking apparatus, a user enters into the passage from the inside of the station yard along the passage A and holds a wireless ticket up to a wireless antenna 342'. At this time, the data recorded on the wireless ticket are read out and prescribed data are recorded on the wireless ticket when required through the wireless communication between the wireless ticket and the wireless antenna 342' likewise the ticket checking process. The main controller 371' compared the data read out from the wireless ticket with the data recorded on the fare memory 374' and checks the approval/disapproval of the passing. When the passing is approved the checking result indicating display 316' lights in blue. When the passing is disapproved, the door 348' is closed and a user is prohibited to pass (prohibit a user to exit to the outside of the station yard). At this time, the checking result indicating display 316' lights in red.

In all the cases described above, the checking results of all automatic ticket checking apparatus and used ticket data including the automatic ticket checking apparatus number which disapproved the passing are notified to a monitor 394.

Hereinafter, the ticket checking process by the automatic ticket checking apparatus will be described referring to a flowchart shown in FIG. 16.

Figure 16:
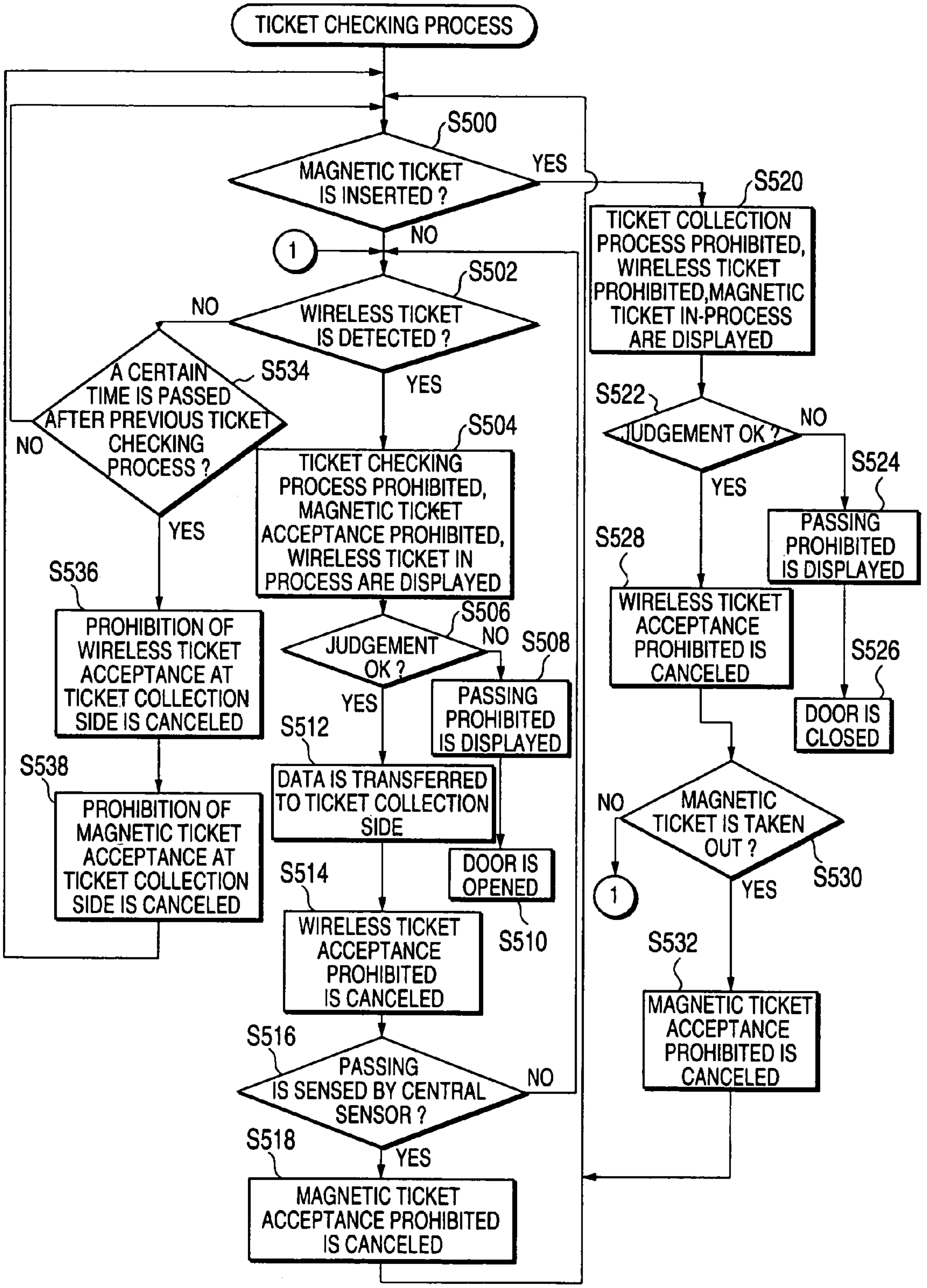
FIG. 16 is a flowchart showing the ticket process in the automatic ticket checking device shown in FIG. 12.

FIG. 16 shows the ticket checking process when entering into a station yard by passing through the passage A using the automatic ticket checking apparatus 310*b* shown in FIG. 15.

First, an insert port shutter 365 of the insert port 312 at the gate (the side to enter into the station yard from the outside) of the automatic ticket checking apparatus 310*b* is kept open so that a magnetic ticket can be inserted. Further, the wireless antenna 342 at the gate side of the automatic ticket checking apparatus 310*b* transmits a signal to a wireless ticket requesting the transmission of a response signal in this state, a main controller 371 checks whether a magnetic ticket was first inserted into the insert port 312 (S500) or a response signal from a wireless ticket was first sensed (S502). When it was judged by this checking that the response signal from the wireless ticket was first sensed, the automatic ticket checking apparatus 310*a* closes the insert port shutter 365 and prohibits the wireless antenna 342 to transmit a signal requesting the wireless ticket to transmit a response signal. Thus, the passing of the passage A to the outside of the station yard from the inside is prohibited. Further, the passage display 340 displays that the entry into the passage A is prohibited as the apparatus is under the checking process. Further, a gate side guidance display 344 of the automatic ticket checking apparatus 310*b* displays that a wireless ticket is under the checking process and closes the insert port shutter 365 to prohibit the insert of a magnetic ticket (S504).

Next, the main controller 371 checks the approval/disapproval of the passing based on a response signal comprising using information including an inherent ID code from a wireless ticket. In other words, when the using condition of a wireless ticket is defined by a using section and period, based on the information of the location of the station wherein the automatic ticket checking apparatus is installed and the date stored in a ROM 372 or a RAM 373, it is checked whether the said station is included in the using section or the date is within the using period. Further, when the using condition is defined by a using amount, it is checked whether there is a usable balance or a balance is available after deducting a prescribed fare that is about an initial fare. Further, in all cases, it is also checked whether the previous use was properly processed (S506).

Based on this judgement, if the using condition is defined by the using section and period, when the said station is included in the using section and the date is within the using period, and if the using condition is defined by a using amount when there is a prescribed balance and when the exit at the last time was properly processed, the entrance into the station yard through the passage A is approved by the automatic ticket checking apparatus 310*b* (Y of S506).

When the entrance is not approved (N of S506), the checking result indicating display 316 displays that the entrance is disapproved (S508), a door 348 is closed and the passing is prohibited (S510) After the passing was prohibited, when the sensors 320–334 did not sense a user (no user in the passage between the automatic ticket checking apparatus), in the state where the ticket checking side insert port shutter 365 of the automatic ticket checking apparatus 310*b* is kept closed, the previous wireless ticket accept prohibiting state by the wireless antenna 342 is canceled so as to enable it to sense a wireless ticket in S502, and after canceling the wireless ticket accepting prohibition, the insert port shutter 365 is opened and the magnetic ticket inserting prohibition is canceled.

When the entrance through the passage A is approved by the automatic ticket checking apparatus 310*b*, such information as the entrance process time and the applicable automatic ticket checking apparatus number (a new balance when the balance was processed) are transmitted to a wireless ticket from the wireless antenna 342 and at the same time, the ID cod contained in the response signal received through the wireless antenna 342 is transmitted to the ticket collection side (RAM 373) only of the automatic ticket checking apparatus 310*b* together with a entrance processing time (or the ID code received time) to store that the ID code was received by the wireless antenna 343 at the ticket checking side of the automatic ticket checking apparatus (S512).

Further, the transmission of ID code to the ticket collection side of the automatic ticket checking apparatus 310*b* is executed to prevent the erroneous reprocessing of the wireless ticket by the automatic ticket checking apparatus 310*b* at the ticket collecting side resulting from the communication of the wireless ticket that was processed at the ticket checking side of the automatic ticket checking apparatus with the wireless antenna 342' at the ticket collecting side of the automatic ticket checking apparatus 310*b* because the width of the automatic ticket checking apparatus 310*b* itself was narrow (the width of the housing between the passages which is about half of the former widths as two units were so far installed was reduced to one unit by staggering the ticket checking side and the ticket collecting side conveying mechanisms without adjoining them each other).

Therefore, when the passage B is acting as a ticket checking passage likewise the passage A (the state where the inert port 365 of an automatic ticket checking apparatus 310*c* is opened, the wireless antenna 342 transmits a requesting signal, the insert port 365' of the automatic ticket checking apparatus 310*b* is closed and the wireless antenna 342' is not transmitting a requesting signal), the wireless antenna 342' of the automatic ticket checking apparatus 310*b* is not in the communication with a wireless ticket and therefore, it does not communicate again with a wireless ticket that was processed at the ticket checking side of the automatic ticket checking apparatus 310*b*, the transmission of ID code may be omitted. Further, when the ticket checking side and the ticket collection side of the automatic ticket checking apparatus 310*b* commonly use a same memory (RAM 373) and store respective data, it may be so constructed as to store ID codes in the said memory without transmitting or transferring ID codes.

When the checking process of the wireless ticket is completed, the acceptance of wireless tickets prohibited in S504 is to be first opened. That is, the transmission of a signal requesting a response signal to a wireless ticket from the ticket checking side wireless antenna 342 of the automatic ticket checking apparatus 310*b* is opened again (S514).

Here, it is checked whether a user who is approved to enter into the station yard in S506 is sensed by the human sensors at the center of the automatic ticket checking apparatus (322 and 330 or 322 and 330, 324, 332 (S516), and when not sensed (a user not yet arrives at the human sensors a the center), return to S502 and judges whether a wireless ticket was checked. Further, at this time, when a used not yet arrives at the human sensors at the center even when a certain time (for example about 3 sec.) passed and the human sensors at the center could do not sense a user, the display 316 guides a user to go ahead into the station yard.

When the arrival of a user is sensed by the human sensors (322 and 330 or 322 and 330, 324, 332) at the center of the automatic ticket checking apparatus, the ticket checking side insert port shutter 365 of the automatic ticket checking apparatus 310*b* is opened and the prohibition to insert a magnetic ticket into the insert port 312 is canceled (S518). After this cancellation, return to S500 to the checking process of magnetic tickets or wireless tickets.

As described above, regarding the acceptance process of magnetic tickets that are inserted into the automatic ticket checking apparatus, because the insert of magnetic tickets is prohibited until a preceding user passes the human sensors at the center, even when a magnetic ticket was conveyed to a forward point, it is possible to prevent a preceding user picks up a magnetic ticket erroneously. Further, regarding a wireless ticket which is not inserted into the automatic ticket checking apparatus and erroneously taken out, as it is so constructed that the next wireless ticket acceptance process is started again at the time when its using information is judged to be valid (prior to accepting a magnetic ticket), the wireless ticket acceptance prohibiting time can be minimized and the flow of users (the number of processes per unit hour) can be promoted.

On the other hand, when it is sensed by the ticket sensors 320–334 that a magnetic ticket was inserted into the insert port 312 prior to a wireless ticket (S500), the insert port shutter 365' of the automatic ticket checking apparatus 310*a* is closed and the request to a wireless ticket by the wireless antenna 342' for a response signal is prohibited like wise S504. Further, the passage display 340 displays that the entrance into the passage A is prohibited as it is in the checking process. Further, it is displayed on the ticket checking side guidance display 344 of the automatic ticket checking apparatus 310*b* that a magnetic ticker is being processed and the insert port shutter 365 of that apparatus is closed to prohibit the insert of a magnetic ticket by next user (S520).

When a magnetic ticket is inserted, it is conveyed by the conveying mechanism 350, the recorded magnetic information is read out by the magnetic head 352 and the magnetic surface of the magnetic ticket is reversed downward by a reversing mechanism 358. The read magnetic information is processed (S522) likewise the checking process of the using information of a wireless ticket (S506).

As a result of the judging process, the entrance into the station yard is not approved (N of S522), the processes by the magnetic heads 354 and 356 are not executed and the guidance that the entrance is not approved is displayed on the checking result indicating display 316 (S524), the door 348 is closed to prohibit the passing (S526) and thereafter, the acceptance of a wireless ticket and a magnetic ticket is sequentially started again likewise S510.

When the entrance through the passage A is approved by the automatic ticket checking apparatus 310*b* (Y of S522), with the conveyance by the conveying mechanism 350, the writing process of such data as an entrance process time and applicable ticket checking apparatus number (a new balance when it was processed) are written on a magnetic ticket by the magnetic heads 354 and 356, and the ticket is returned to the take-out port 314. Further, in the step S512, an ID code was transferred but when a magnetic ticket is only held up (presented), it is not processed but required to insert a magnetic ticket into the insert port 312' and it will not be erroneously inserted and therefore, a magnetic ticket is not transferred here.

When the entrance through the passage A is approved by the automatic ticket checking apparatus. 310*b* (Y of S522) or when data is written on a magnetic ticket by the magnetic head 356, the wireless ticket acceptance prohibiting state by the wireless antenna 342 is canceled in the state where the insert of a magnetic ticket is prohibited (S528). After the cancellation, based on the sensing by a ticket sensor 379 provided to the take-out port 314, it is judged whether a magnetic ticket was taken out from the take-out port 314 by a user (S530). When judged that the magnetic ticket was not taken out, it is judged whether a wireless ticket is sensed (whether a response signal is received) in S502. Further, when it was judged that a magnetic ticket was taken out, the insert port shutter 365 is opened, the prohibition of acceptance of a wireless ticket is canceled and the prohibition of the insert of magnetic ticket by a user is canceled (S532).

Further, when the automatic ticket checking apparatus 310*b* is in the state where the checking process is (the state where the entrance into the station yard from the outside can be processed) and the automatic ticket checking apparatus 310*a* (a ticket collection side automatic ticket checking apparatus which operates when a user exits from the station yard to the outside) is in the state where the acceptance of magnetic and wireless tickets is prohibited, if a magnetic ticket and a wireless ticket are not accepted, in the steps S500 and S502, it is checked whether a certain time (for example 3–5 sec.) passed from the last checking process (S534). As a result of this checking it is found that a certain time passed, in the state with the insert port shutter 365' of the automatic ticket checking apparatus 310*a* kept closed, the state of the previous wireless ticket acceptance prohibition by the wireless antenna 342' is cancelled (S536), the wireless ticket detectable state in S502 results. Thereafter, following the cancellation of the wireless ticket acceptance prohibition, when the prohibition of a magnetic ticket insert into the insert port 312' is cancelled by opening the insert port shutter 365' (S538), it becomes possible to insert a magnetic ticket in S500. This is because a wireless antenna 342' is provided at the latter stage of the insert port 312' for the advancing direction of user. Thus, even when a user carrying a magnetic ticket follows another user carrying a wireless ticket, a user having a magnetic ticket, regarding it possible to insert a ticket into the insert port 312', tries to insert a magnetic ticket by reaching his hand from behind a user having a wireless ticket, the wireless processing of the wireless ticket is already started and a magnetic ticket will not be processed preferentially and therefore, such a problem that the orders of users and tickets are replaced can be solved.

Next, referring to a flowchart shown in FIG. 17, the wireless ticket processing at the ticket collection side (when exits to the outside of the station yard from the inside by passing the passage B) of the automatic ticket checking apparatus 310*b* will be described.

Figure 17:
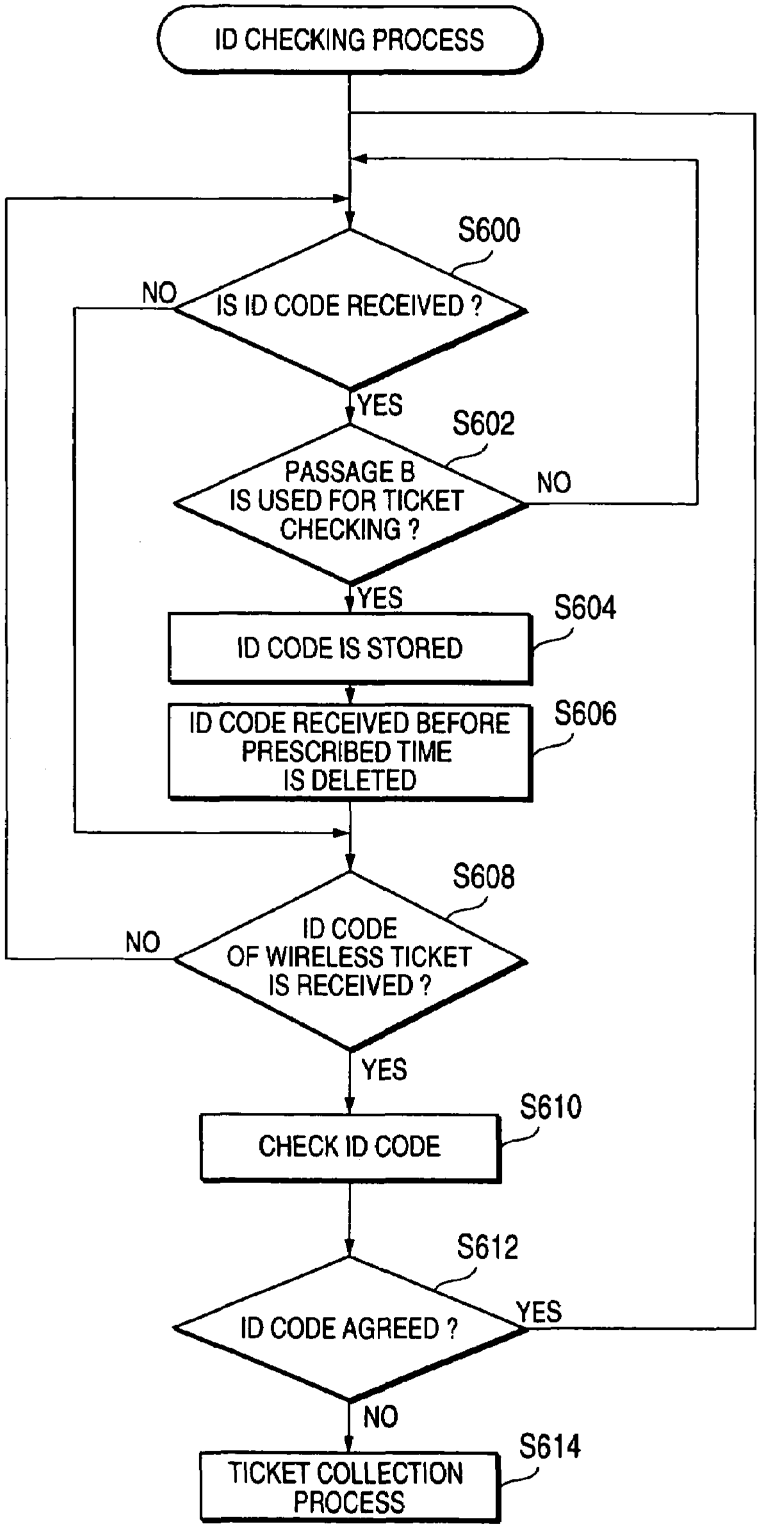
FIG. 17 is a flowchart showing the ID code checking process in the automatic ticket checking apparatus shown in FIG. 12.

FIG. 17 shows the wireless ticket process at the ticket collection side of the automatic ticket checking apparatus 310*b* 16 when the checking process is being executed at the ticket checking side of the automatic ticket checking apparatus 310*b* shown in FIG. 16

The ticket collection side of the automatic ticket checking apparatus 310*b* operates same as the automatic ticket checking apparatus 310*a* (the ticket collection side apparatus). When the ticket checking side of the automatic ticket checking apparatus 310*c* is operating bad checking the approval/disapproval of a user entering into the station yard from the outside passing through the passage B, the insert port shutter 365' is closed to prohibit the insert of a magnetic ticket and the acceptance of a wireless ticket is prohibited without transmitting a request signal by the wireless antenna 342'. Further, when the passage B is used by a user as a ticket collecting passage or the passage B is usable as the ticket collection passage as well as the ticket checking passage, the insert port shutter 365' is opened to enable the insert of a magnetic ticket into the insert port 312', and a response requesting signal is transmitted to the wireless ticket by the wireless antenna 342'.

At the ticket collection side of the automatic ticket checking apparatus 310*b*, an ID code of a wireless ticket is transmitted/transferred from the ticket checking side of the automatic ticket checking apparatus 310*b* (S600).

When an ID code is transmitted/transferred, the ticket collection side of the automatic ticket checking apparatus 310*b* checks whether the passage B is used as a ticket collection passage by the main controller 317' (S602). When the passage B is judged by this checking as being used as the ticket checking passage (NO of S602), the step returns to S600 without storing the ID code transmitted from the ticket checking side of the automatic ticket checking apparatus. This is because the wireless antenna 342' at the ticket collection side of the automatic ticket checking apparatus 310*b* is not communicating with a wireless ticket when the passage B is being used as a ticket checking passage and therefore, no communication is made with the wireless ticket which was processed at the ticket checking side of the automatic ticket checking apparatus 310*b* and the ticket is not doubly processed.

When the passage B is judged as being used as a ticket collection passage by the checking in S602 (Y of S602), the ID code of the wireless ticket transmitted/transferred from the ticket checking side of the automatic ticket checking apparatus 310*b* is stored in a RAM 373' (S604). The ID code stored in the RAM 373' is erased form the RAM 373' by the control of the main controller 371' when a prescribed time (for example, about 5 sec.) passed after transmitted/transferred (S606). Further, this ID code may not be erased when a time passed but the construction/method may be such that latest ID codes only in prescribed numbers (for example, 2 codes) are stored or may be a combination of a construction/method to delete ID codes after a certain time passed with a construction to store a prescribed number of ID codes only.

In the state where the ID code of the wireless ticket processed at the ticket checking side of the automatic ticket checking apparatus 310*b* is stored in the RAM 373', the wireless ticket is communicated with the wireless antenna 342 at the ticket collection side of the automatic ticket checking apparatus 310*b* and checked whether the ID code of the wireless ticket was received (S608. The same as S502 shown in FIG. 5.)

When it is judged that the ID code of the wireless ticket is not received (a wireless ticket is not presented by a user) in S608, the step returns to S600. When it is judged that the ID code of the wireless ticket is received in S608, the ID code of the received wireless ticket is compared with the ID code of the wireless ticket transmitted/transferred from the ticket checking side of the automatic ticket checking apparatus, which is stored in the RAM 373' (S610).

As a result of the comparison in S610, when both ID codes are judged agreed with each other (S612), it is judged that the information of the wireless ticket received by the ticket collection side wireless antenna 342' is the information of the wireless ticket erroneously presented to the ticket collection side wireless antenna 342' by a user after the checking process by the opposite ticket checking side wireless antenna 342', and in order to prevent the double process of the wireless ticket, the wireless ticket received here is not processed (the execution of the checking for approval/disapproval of the passing is prohibited) Then, the passing through the ticket collecting passage (to the outside from the inside of the station yard) by closing the door 348' of the passage B, and a guidance that the wireless ticket is not invalid but the passing is prohibited (for example, such a display "WAIT FOR A WHILE", etc.) is displayed on the guidance display 344' or 316'. These passing prohibition and display are canceled/erased after a prescribed time (about 3–5 sec.). Further, when a wireless ticket having the same ID code that was received in S608 was wireless communicated again after this display was canceled (or the ID code from the RAM 373' was erased), an ID code agreed with the ID code stored in the RAM 373' was not stored, the ID codes are judged to be disagreed and the process in S614 is executed (the judgement for the approval/disapproval of passing is executed).

As the ID code transmitted/transferred in S512 shown in FIG. 16 is used in the above step S610, even when the automatic ticket checking apparatus 310 has a narrow width and a wireless ticket (its using data) received and processed by the ticket checking side (one side) wireless antenna 342 was received by the ticket collection side (one side) wireless antenna 342', the receiving/processing are not executed by the ticket collection side (other side) wireless antenna 342' based on a ticket's unique data such as ID code, etc. received by the ticket checking (one side) wireless antenna 342. Therefore, it is possible to prevent an unnecessary double processes of a wireless ticket; that is, the erroneous the ticket collection process (exit from the station yard) immediately after the ticket checking process (entrance into the station yard).

Further, even when such a display as "WAIT FOR A WHILE" is being displayed on the guidance display 344 and 366, this state is not an abnormal state caused by errors/defects in use (using information) of a wireless ticket. Further, when a wireless ticket was erroneously presented as in this case, the said user already entered into the station yard and possibly went away from the automatic ticket checking apparatus 310*b*. So, in this case, the display state "WAIT FOR A WHILE" is reset rapidly (in order to restart the wireless ticket acceptance, process preferentially) and therefore, even when such the guidance is being displayed, if a wireless ticket having an ID code different from the wireless ticket which was compared in S610 is received (No in S608, S612) and this wireless ticket is valid and the passing can be approved, the guidance being display is erased rapidly and changed to a display urging the passing of a user. Thus, the wireless ticket acceptance suspending time can be minimized.

As a result of the comparison in S610, when it is judged that an ID code of a wireless ticket, which differs from that stored in the RAM 373' was received, based on the using information of the said wireless ticket, the approval/disapproval of a user having that wireless ticket is judged (S614).

Further, the process of wireless tickets after S614 and the process when magnetic tickets are inserted are almost the same as the checking process shown in FIG. 16, and can be explained by replacing "Ticket Checking", etc. with "Ticket Collection" and the explanation will be omitted.

Further, the ID code checking process in FIG. 17 is executed similarly in S506, etc. in FIG. 16 but is omitted here to avoid the duplicated explanation.

Further, the embodiment of the present invention is so constructed that the using information of the wireless ticket received and processed by the ticket checking side (one side) wireless antenna 342 is not received by the ticket collection side (the other side) wireless antenna 342' of the same housing. This is because a wireless antenna at the opposite side of the same housing may be considered as a wireless antenna to which a user may possibly present a wireless ticket erroneously. However, it may be so constructed as to transmit using information of a wireless ticket received and processed to the ticket checking side or the ticket collection side of other plural units of automatic ticket checking apparatus.

In this invention, when the passing of a user is approved through the wireless communication with a wireless ticket by the ticket checking wireless antenna 342 provided at one side of the automatic ticket checking apparatus, if the wireless ticket of the user who is approved to pass is wirelessly communicated through the adjacent ticket collection wireless antenna 342' provided at the other side, it is judged that the wireless ticket presented by the user for the ticket checking is erroneously presented the wireless ticket to the ticket collection wireless antenna 342', and the said ticket is not wirelessly communicated. By this construction, it becomes possible to prevent such a problem that the ticket collection process is executed by the ticket collection wireless antenna 342' regardless a user's intention and user's exit data is recorded on a wireless ticket although the user enters into the station yard properly and is treated as the exit state on the system and ticket data (not entered) and when exiting from the station yard, the user is judged to have no entry data and regarded as illegally entered.

Further, likewise the above construction, the wireless communication with a wireless ticket is prohibited and the exit of a user from an adjacent passage is temporarily prohibited by the ticket collection wireless antenna 342'. Thus, it becomes possible to leave a processing interval between a user and a next user by prohibiting the exit temporarily and therefore, it is possible to prevent the mistaking of a combination of a wireless ticket data which is wirelessly communicating by an automatic ticket checking apparatus and a user who is carrying a wireless ticket.

Further, this invention is so constructed that in the acceptance process of a wireless ticket or a magnetic ticket, the wireless communication with a wireless ticket and the insert of a magnetic ticket at the ticket checking side or the ticket collection side are prohibited. When this prohibition is canceled, the wireless communication with a wireless ticket is first canceled and then, the insert of a magnetic ticket is canceled. According to this construction, even when a user carrying a magnetic ticket follows slightly behind (or at the side) a user carrying a wireless ticket, and a user carrying a magnetic ticket, regarding it possible to insert a ticket into the insert port, tries to insert a magnetic ticket by reaching the hand from behind a user carrying a wireless ticket, the wireless processing for the wireless ticket is already started at that time and the magnetic ticket will not be processed preferentially and the replacement of the order of a user and a ticket can be prevented.

As described above, according to this invention and the automatic ticket checking method, even when a wireless ticket carried by a user who is already approved to pass the automatic ticket checking apparatus was erroneous presented again, the erroneous presentation is recognized and the wireless communication with a wireless ticket can be surely executed correctly.

What is claimed is:

1. An automatic ticket checking apparatus comprising:
- a main body which defines a first passage to one side thereof and a second passage to another side thereof;
- first receiving means provided at one end of the main body for receiving a first magnetic ticket;
- a first conveying mechanism for conveying the first magnetic ticket in a first direction from the first receiving means to about a center of the apparatus along the first passage;
- first ticket checking means for reading information recorded on the first magnetic ticket and a first wireless ticket and judging whether or not the information read by the first checking means is valid;
- first eject means provided at about the center of the main body for ejecting the first magnetic ticket conveyed by the first conveying mechanism to about the center of the main body;
- second receiving means provided near the other end of the main body for receiving a second magnetic ticket;
- a second conveying mechanism arranged opposite side of the first conveying mechanism in the main body for conveying the second magnetic ticket in a second direction opposite to the first direction from the second receiving means to about the center of the main body along the second passage;
- second ticket checking means for reading information recorded on the second magnetic ticket and a second wireless ticket and judging whether or not the information read by the second checking means is valid; and
- second eject means provided at about the center of the main body for ejecting the second magnetic ticket conveyed by the second conveying mechanism to about the center of the main body.

2. The automatic ticket checking apparatus according to claim 1, wherein
- the first conveying mechanism is provided at the first passage side of the main body, and
- the second conveying mechanism is provided at the second passage side of the main body.

3. The automatic ticket checking apparatus according to claim 1, further comprising:
- a first cover configured to cover the first conveying mechanism from its one end to about the center along the passage; and
- a second cover, which is separated from the first cover, configured to cover the second conveying mechanism from its other end to about the center along the passage.

4. The automatic ticket checking apparatus according to claim 3, further comprising:
- control means for controlling the first and second conveying mechanism to be maintained collectively; and
- switching means for switching a maintenance object by the control means to the first ticket checking means when the first cover is opened, and switching a maintenance object by the control means to the second ticket checking means when the second cover is opened.

5. The automatic ticket checking apparatus according to claim 4, further comprising:
- designating means for accepting the selection and designation of a maintenance object by the control means.

6. The automatic ticket checking apparatus according to claim 3, wherein
- the first cover is provided to open/close freely without obstructing a user to pass the second passage in the second direction, and
- the second cover is provided to open/close freely without obstructing a user to pass the first passage in the first direction.

7. The automatic ticket checking apparatus according to claim 1, further comprising:
- collecting means for collecting the first and second magnetic tickets conveyed by the first and second conveying mechanism collectively.

8. The automatic ticket checking apparatus according to claim 7, wherein
- the collecting means is configured to be able to take out the collected magnetic tickets from either the first or the second passage side.

9. The automatic ticket checking apparatus according to claim 8, further comprising:
- first holding means for temporarily holding the magnetic tickets to be collected in the collecting means out of the magnetic tickets conveyed by the first conveying mechanism while the magnetic tickets accommodated in the collecting means are taken out of the second passage side; and
- second holding means for temporarily holding the magnetic tickets to be collected in the collecting means out of the magnetic ticket conveyed by the second conveying mechanism while the magnetic tickets accommodated in the collecting means are taken out of the first passage side.

10. The automatic ticket checking apparatus according to claim 9, further comprising:
- first prohibiting means for prohibiting the receipt by the first receiving means when the magnetic ticket holding capacity of the first holding means reaches the saturated state; and
- second prohibiting means for prohibiting the receipt by the second receiving means when the magnetic ticket holding capacity of the second holding means reaches the saturated state.

11. The automatic ticket checking means according to claim 1, further comprising:
- common display means for displaying a guidance relative to the process by the first and second ticket checking means.

12. The automatic ticket checking apparatus according to claim 11, wherein the common display means includes:
- a first display to display a guidance relative to the process by the first ticket checking means; and
- a second display to display a guidance relative to the process by the second ticket checking means;

wherein the first display is given with directivity so that the guidance displayed on the first display is not visible from a user who is going in the second direction, and the second display is given with directivity so that the guidance displayed on the second display is not visible from a user who is going in the first direction.

13. The automatic ticket checking apparatus according to claim 12, further comprising:

a first shading plate arranged at the first display so as to give prescribed directivity to the first display; and a second shading plate arranged at the second display so as to give prescribed directivity to the second display.

14. An automatic ticket checking apparatus comprising:

a main body which defines a first passage to one side thereof and a second passage to another side thereof;

first receiving means provided to the main body for receiving using data from a first wireless ticket which is carried by a first user who is passing the first passage in a first direction and recording the using data;

first judging means for judging a passing propriety of the first user based on the using data received by the first receiving means;

approving means for approving the passing of the first user when the passing is judged to be approved by the first judging means;

second receiving means provided to the main body for receiving using data from a second wireless ticket which is carried by a second user passing the second passage in a second direction opposite to the first direction and recording the using data;

second judging means for judging a passing property of the second user based on the using data received by the second receiving means;

third judging means for Judging whether the second wireless ticket is the same as the first wireless ticket that is carried by the first user who was approved to pass by the approving means based on the using data received by the second receiving means;

prohibiting means for prohibiting the execution of judging the passing property of the second user by the second judging means when the second wireless ticket is judged to be the same as the first wireless ticket by the third judging means; and control means for executing the judging a passing property of the second user by the second judging means when the second wireless ticket is judged differing from the first wireless ticket by the third judging means.

15. The automatic ticket checking apparatus according to claim 14, further comprising:

means for receiving identification data inherent to each ticket recorded on the wireless ticket therefrom; and storage means for storing the identification data of the received wireless ticket;

wherein the third judging means judges whether the second wireless ticket is the same as the first wireless ticket based on the identification data stored in the storage means.

16. The automatic ticket checking apparatus according to claim 15, further comprising:

erasing means for erasing the identification data from the storage means when a prescribed time passed after storing the identification data stored in the storage means.

17. An automatic ticket checking apparatus comprising:

a main body which defines a first passage to one side thereof and a second passage to another side thereof;

first wireless communication means provided at one end of the main body into which a first user enters the passage in a first direction for wireless communicating with a first wireless ticket carried by the first user;

first judging means for judging a passing propriety of the first user based on the result of the wireless communication with the first wireless ticket by the first communication means;

approving means for approving the passing of the first user when the passing is judged to be approved by the first judging means;

second wireless communication means provided at the other end of the main body into which a second user enters the second passage in a second direction opposite to the first direction for wireless communicating with a second wireless ticket carried by the second user;

second judging means for judging whether the wireless ticket which is wireless communicated is the same as the first wireless ticket carried by the first user whose passing is approved by the approving means based on the wireless communication by the second wireless communication means;

third judging means for judging a passing propriety of the second user based on the result of the wireless communication with the second wireless ticket by the second wireless communication means when the second wireless ticket is not the same as the first wireless ticket by the second judging means; and prohibiting means for prohibiting the judgment of the third judging means when the second wireless ticket is judged to be the same as the first wireless ticket by the second judging means.

18. The automatic ticket checking apparatus according to claim 17, further comprising:

canceling means for canceling the prohibition of judgment of passing by the prohibiting means;

passing propriety judging means for judging a passing propriety of a user based on the result of wireless communication which was made again with the second wireless ticket that was judged to be the same as the first wireless ticket-by the second wireless communicating means after canceling the prohibition of passage by the canceling means; and passing approving means for approving the passing of the second user when the passing is judged to be approved by the passing propriety judging means.

19. The automatic ticket checking apparatus according to claim 17, further comprising:

means for receiving identification data inherent to every ticket stored in the wireless ticket therefrom; and storage means for storing the received identification data of the wireless ticket;

wherein the second judging means judges whether the wireless ticket with which communicated wirelessly is the first wireless ticket based on the identification data stored in the storage means.

20. The automatic ticket checking apparatus according to claim 19, further comprising:

erasing means for erasing an identification data from the storage means when a prescribed time passed after the identification data stored in the storage means was stored therein.

21. The automatic ticket checking apparatus according to claim 20, further comprising:

canceling means for canceling the prohibition of judgment of passing propriety by the prohibiting means when the identification data is erased by the erasing means;

passing propriety judging means for judging a passing propriety of a user based on the result of wireless communication that was made again with the second ticket judged to be the same as the first wireless ticket by the second wireless communication means after canceling by the canceling means; and passing approving means for approving the passing of the second user when the passing is to be approved by the passing propriety judging means.

22. The automatic ticket checking apparatus according to claim 17, wherein the second judging means further judges whether it is within a prescribed time from the wireless communication with the first wireless ticket by the first wireless communication means; and the prohibiting means prohibits a user carrying the wireless ticket to pass to the passage in the direction differing from the prescribed passage when judged to be within the prescribed time from the wireless communication with the first wireless ticket by the first wireless communication means.

23. An automatic ticket checking apparatus according to claim 17, further comprising:

canceling means for canceling the prohibition of the passing by judgment of passing by the prohibiting means after a prescribed time; and second approving means for approving the passing of a user preferentially to the cancellation of the passing prohibition by the canceling means when judged the passing is to be approved by the third judging means.

24. An automatic ticket checking apparatus comprising:

a main body which defines a first passage to one side thereof and a second passage to another side thereof;

first wireless communicating means provided to the main body for wireless communicating with a first wireless ticket carried by a first user who is passing the first passage in a first direction;

first judging means for judging a passing propriety of the first user based on the result of wireless communication with the first wireless ticket by the first wireless communication means;

second wireless communicating means provided to the main body for wireless communicating with a second wireless ticket carried by a second user who is passing the second passage in a second direction opposite to the first direction;

approving means for approving the passing of the first user when the passing is judged to be approved by the first judging means;

storage means for storing data shown the first wireless ticket carried by the first user who is approved to pass by the approving means;

second judging means for judging whether the second wireless ticket with which wirelessly communicated is the same as the first wireless ticket stored in the storage means based on the wireless communication by the second wireless communication means;

prohibiting means for prohibiting a user to pass the second passage when the wireless ticket with which wirelessly communicated by the second wireless communicating means is judged to be the first wireless ticket by the second judging means; and control means for prohibiting the storing of the storage means when the second wireless communicating means is not making the wireless communication with a wireless ticket.

25. An automatic ticket checking apparatus comprising:

a main body which defines a first passage to one side thereof and a second passage to another side thereof;

a first insert port provided at one side of the main body, into which a magnetic ticket is inserted by a user who is passing the first passage in a first direction;

first insert prohibiting means for prohibiting the insert of the magnetic ticket into the first insert port;

first wireless communication means provided at one side of the main body likewise the first insert port for wireless communicating with a wireless ticket carried by a user passing the first passage in the first direction;

second insert port provided at the other side of the main body, into which a magnetic ticket is inserted by a user who is passing the second passage in a second direction opposite to the first direction;

second insert prohibiting means for prohibiting the insert of the magnetic ticket into the second insert port;

second wireless communication means provided at the other side of the main body likewise the second insert port for wireless communicating with a wireless ticket carried by a user who is passing the second passage in the second direction;

approving means for approving the passing of a user who is carrying a magnetic ticket or a wireless ticket based on using data recorded on the magnetic ticket inserted into the first or second insert port or the wireless ticket with which wireless communicated by the first or second wireless communication means;

control means for prohibiting the insert of a magnetic ticket into the second insert port by driving the second insert prohibiting means and the wireless communication with a wireless ticket by the second wireless communication means when the magnetic ticket is inserted into the first insert port or the wireless ticket is wireless communicated by the second wireless communication means; and cancellation means for canceling the prohibition of wireless communication of the second wireless communication means which was prohibited to make the wireless communication by the control means and after this cancellation, to cancel the prohibition of the insert of a magnetic ticket into the second insert port by driving the second insert prohibiting means when the passing of a user is approved by the: approving means based on the using data of the magnetic ticket inserted into the first insert port or a wireless ticket with the wireless communicated by the first wireless communication means.

26. A ticket checking method of an automatic ticket checking apparatus including a main body defining a first passage to one side thereof and a second passage to another side thereof with a first insert port and first wireless communicating means provided at one side of the main body and a second insert port and a second communicating means at the other side of the main body, comprising:

prohibiting the insert of a magnetic ticket into the second insert port by a user who is passing the second passage and prohibiting the wireless communication with a wireless ticket carried by a user who is passing second passage by the second wireless communicating means when a magnetic ticket is inserted into the first insert port by a user who is passing along the first or a wireless ticket carried by a user who is passing the first passage by the first wireless communication means; reading using data recorded on the magnetic ticket inserted into the first insert port or the wireless ticket with which wireless communicated by the first wireless communication means;

approving the passing of users who are carrying respective tickets based on the read using data;

canceling the prohibition of the wireless communication by the second wireless communicating means which was prohibited to make the wireless communication after approving the passing of a user carrying a ticket; and canceling the prohibition of the insert of a magnetic ticket into the second insert port after canceling the wireless communication.

27. A ticket checking method of an automatic checking apparatus including a main body which defines a first passage to one side thereof and a second passage to another side thereof, a first receiving means provided to the main body for receiving using data from a first wireless ticket which is carried by a first user who is passing the first passage in a first direction and recording the using data, first judging means for judging a passing propriety of the first user based on the using data received by the first receiving means, approving means for approving the passing of the first user when the passing is judged to be approved by the first judging means, second receiving means provided to the main body for receiving using data from a second wireless ticket which is carried by a second user passing the second passage in a second direction opposite to the first direction and recording the using data, second judging means for judging a passing property of the second user based on the using data received by the second receiving means, the method comprising:

judging whether the second wireless ticket is the same as the first wireless ticket that is carried by the first user who has approved to pass by the approving means based on the using data received by the second receiving means;

prohibiting the execution of judging the passing property of the second user by the second judging means when the second wireless ticket is judged to be the same as the first wireless ticket by the third judging means; and executing the judging a passing property of the second user by the second judging means when the second wireless ticket is judged differing from the first wireless ticket by the third judging means.

* * * * *